(12) United States Patent
Parthasarathy et al.

(10) Patent No.: US 10,783,046 B2
(45) Date of Patent: Sep. 22, 2020

(54) EXECUTING RESOURCE MANAGEMENT OPERATIONS IN DISTRIBUTED COMPUTING SYSTEMS

(71) Applicant: Nutanix, Inc., San Jose, CA (US)

(72) Inventors: Ranjan Parthasarathy, Milpitas, CA (US); Vinod Gupta, Fremont, CA (US); Digvijay Dalapathi, Seattle, WA (US)

(73) Assignee: Nutanix, Inc., San Jose, CA (US)

( * ) Notice: Subject to any disclaimer, the term of this patent is extended or adjusted under 35 U.S.C. 154(b) by 32 days.

(21) Appl. No.: 15/818,704

(22) Filed: Nov. 20, 2017

(65) Prior Publication Data

US 2020/0026624 A1    Jan. 23, 2020

Related U.S. Application Data

(60) Provisional application No. 62/425,484, filed on Nov. 22, 2016, provisional application No. 62/434,456, filed on Dec. 15, 2016.

(51) Int. Cl.
*G06F 11/20* (2006.01)
*G06F 11/14* (2006.01)
*G06F 11/36* (2006.01)

(52) U.S. Cl.
CPC ........ *G06F 11/203* (2013.01); *G06F 11/1471* (2013.01); *G06F 11/3688* (2013.01); *G06F 2201/805* (2013.01); *G06F 2201/82* (2013.01)

(58) Field of Classification Search
CPC .. G06F 11/3688; G06F 11/261; G06F 11/263; G06F 11/1471
See application file for complete search history.

(56) References Cited

U.S. PATENT DOCUMENTS

| | | | |
|---|---|---|---|
| 6,647,408 B1 * | 11/2003 | Ricart | G06F 9/50 |
| | | | 711/147 |
| 8,407,182 B1 | 3/2013 | Rajaa et al. | |
| 8,418,176 B1 | 4/2013 | Keagy et al. | |
| (Continued) | | | |

OTHER PUBLICATIONS

U.S. Appl. No. 15/224,206, filed Jul. 29, 2016, 60 pages.
(Continued)

*Primary Examiner* — Jigar P Patel
(74) *Attorney, Agent, or Firm* — Vista IP Law Group, LLP

(57) ABSTRACT

Computing cluster system management. Embodiments implement fine-grained rule-based approaches to error recovery. A service dispatches tasks to components of the computing cluster. At the time of task dispatching, entries are made into a write-ahead log. The write-ahead log entries serve for recording task and component attributes. A monitor detects a failure event raised by one or more of the components of the computing cluster. Responses to the failure event include determining a set of conditions that are present in the computing cluster at the time of the detection, and then using the failure event and the determined conditions in combination with a set of fine-grained failure processing rules to determine one or more recovery actions to take. Recovery actions include redistributing the failed task to a different node or to different service. Certain conditions and rules initiate actions that rollback the state of a component to a previous success point.

23 Claims, 14 Drawing Sheets

(56) References Cited

U.S. PATENT DOCUMENTS

| | | | |
|---|---|---|---|
| 8,539,484 B1 | 9/2013 | Offer et al. | |
| 8,549,518 B1 | 10/2013 | Aron et al. | |
| 8,601,473 B1 | 12/2013 | Aron et al. | |
| 8,850,130 B1 | 9/2014 | Aron et al. | |
| 8,997,097 B1 | 3/2015 | Aron et al. | |
| 9,052,936 B1 | 6/2015 | Aron et al. | |
| 9,256,374 B1 | 2/2016 | Aron et al. | |
| 9,256,475 B1 | 2/2016 | Aron et al. | |
| 9,262,200 B2 | 2/2016 | Buck et al. | |
| 9,336,103 B1 | 5/2016 | Hasbe et al. | |
| 9,354,912 B1 | 5/2016 | Aron et al. | |
| 9,389,887 B1 | 7/2016 | Aron et al. | |
| 9,501,379 B2 | 11/2016 | Gill et al. | |
| 9,575,784 B1 | 2/2017 | Aron et al. | |
| 9,613,119 B1 | 4/2017 | Aron et al. | |
| 9,619,257 B1 | 4/2017 | Aron et al. | |
| 9,619,490 B2 | 4/2017 | Aron et al. | |
| 9,667,475 B2* | 5/2017 | Little | H04L 41/0672 |
| 9,715,347 B2 | 7/2017 | Ryu et al. | |
| 9,720,921 B1 | 8/2017 | Bhattacharyya et al. | |
| 9,772,866 B1 | 9/2017 | Aron et al. | |
| 9,811,522 B2 | 11/2017 | St. Laurent et al. | |
| 9,817,606 B1 | 11/2017 | Byrne et al. | |
| 9,886,215 B1 | 2/2018 | Ramachandran et al. | |
| 10,120,764 B1 | 11/2018 | Ramachandran et al. | |
| 2002/0089692 A1* | 7/2002 | Ferlitsch | G06F 3/121 358/1.15 |
| 2003/0101321 A1 | 5/2003 | Ohran | |
| 2005/0283664 A1* | 12/2005 | Coulter, Jr. | G06F 11/261 714/15 |
| 2007/0300220 A1 | 12/2007 | Seliger et al. | |
| 2008/0244577 A1 | 10/2008 | Le et al. | |
| 2009/0172662 A1 | 7/2009 | Liu | |
| 2009/0313447 A1 | 12/2009 | Nguyen et al. | |
| 2011/0126110 A1 | 5/2011 | Vilke et al. | |
| 2011/0184993 A1 | 7/2011 | Chawla et al. | |
| 2012/0054742 A1 | 3/2012 | Eremenko et al. | |
| 2012/0072910 A1 | 3/2012 | Martin et al. | |
| 2012/0110574 A1 | 5/2012 | Kumar | |
| 2012/0137098 A1 | 5/2012 | Wang et al. | |
| 2012/0144229 A1 | 6/2012 | Nadolski | |
| 2012/0254865 A1 | 10/2012 | Saeki et al. | |
| 2012/0278512 A1* | 11/2012 | Alatorre | G06F 3/0605 710/33 |
| 2012/0304168 A1 | 11/2012 | Raj Seeniraj et al. | |
| 2013/0007506 A1 | 1/2013 | Jain et al. | |
| 2013/0061089 A1 | 3/2013 | Valiyaparambil et al. | |
| 2013/0239108 A1 | 9/2013 | Lee et al. | |
| 2013/0326260 A1 | 12/2013 | Wei et al. | |
| 2014/0279919 A1 | 9/2014 | Sygulla et al. | |
| 2015/0058839 A1 | 2/2015 | Madanapalli et al. | |
| 2015/0082306 A1 | 3/2015 | Shin et al. | |
| 2015/0095097 A1* | 4/2015 | DeJardine | G06Q 10/0633 705/7.27 |
| 2015/0143381 A1* | 5/2015 | Chin | G06F 9/485 718/104 |
| 2016/0179635 A1 | 6/2016 | Kondalsamy et al. | |
| 2016/0188232 A1 | 6/2016 | Ramachandran et al. | |
| 2016/0203013 A1 | 7/2016 | Bayapuneni et al. | |
| 2016/0203069 A1 | 7/2016 | Gill et al. | |
| 2016/0203166 A1 | 7/2016 | Aron et al. | |
| 2016/0335106 A1 | 11/2016 | Behere et al. | |
| 2017/0060707 A1 | 3/2017 | Harper et al. | |
| 2017/0060975 A1 | 3/2017 | Akyureklier et al. | |
| 2017/0109184 A1 | 4/2017 | Ramani et al. | |
| 2017/0149778 A1 | 5/2017 | Gill et al. | |
| 2017/0169130 A1 | 6/2017 | Aron et al. | |
| 2017/0206149 A1 | 7/2017 | Aron et al. | |
| 2017/0235596 A1 | 8/2017 | Vankadaru et al. | |
| 2017/0235652 A1 | 8/2017 | Natanzon et al. | |
| 2017/0264493 A1* | 9/2017 | Cencini | G06F 9/5083 |
| 2017/0322827 A1* | 11/2017 | Little | G06F 11/3428 |
| 2017/0322943 A1 | 11/2017 | Bhattacharyya et al. | |
| 2017/0364079 A1 | 12/2017 | Arsenian et al. | |

OTHER PUBLICATIONS

U.S. Appl. No. 15/224,358, filed Jul. 29, 2016, 61 pages.

U.S. Appl. No. 14/985,360, filed Dec. 30, 2015, 50 pages.

U.S. Appl. No. 15/081,489, filed Mar. 25, 2016, 52 pages.

Non-Final Office Action dated Mar. 2, 2018 for related U.S. Appl. No. 15/224,206.

Non-Final Office Action dated Mar. 7, 2018 for related U.S. Appl. No. 15/224,358.

Notice of Allowance dated Jul. 2, 2018 for related U.S. Appl. No. 15/224,206.

Notice of Allowance dated Jul. 20, 2018 for related U.S. Appl. No. 15/224,358.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Cano, I. et al., "Curator: Self-Managing Storage for Enterprise Clusters", 14th USENIX Symposium on Networked Systems Design and Implementation, NSDI '17, (Mar. 27, 2017).

Non-Final Office Action dated Mar. 3, 2020 for related U.S. Appl. No. 16/214,920.

* cited by examiner

EXECUTING RESOURCE MANAGEMENT OPERATIONS IN DISTRIBUTED COMPUTING SYSTEMS

RELATED APPLICATIONS

The present application claims the benefit of priority to U.S. Patent Application Ser. No. 62/425,484 titled, "EXECUTING RESOURCE CONFIGURATION CHANGES IN DISTRIBUTED COMPUTING SYSTEMS", filed Nov. 22, 2016, and the present application also claims the benefit of priority to U.S. Patent Application Ser. No. 62/434,456 titled, "INTENT FRAMEWORK", filed Dec. 15, 2016, both of which are hereby incorporated by reference in their entirety.

FIELD

This disclosure relates to distributed computing system management, and more particularly to techniques for fail-safe execution of resource management operations in distributed computing systems.

BACKGROUND

Modern distributed computing systems have evolved to include capabilities for natively coordinating distributed computing resources, storage resources, networking resources, and/or other distributed resources in such a way that incremental scaling can be accomplished in many dimensions (e.g., more computing nodes, more storage, more networking ports, etc.), in some cases merely by adding a new preconfigured node to a cluster of many already operating nodes. Some such clusters might be composed of hundreds of nodes or more that support several thousand or more autonomous virtualized entities (VEs) such as virtual machines (VMs), containers, etc. that are individually tasked to perform one or more of a broad range of computing workloads. In many cases, several thousand VEs might be launched (e.g., in a swarm of VMs) to perform some set of tasks, then finish and collate their results, then self-terminate. As such, the working data, configuration (e.g., topology, resource distribution, etc.), and/or other characteristics of the distributed system can be highly dynamic.

Some system configuration changes in such large scale, highly dynamic distributed computing systems are a result of newly-raised resource management operations (e.g., resource scheduling operations initiated by a cluster administrator) that are processed by various components of the system. For example, a newly-raised resource management operation might include commands to migrate a certain VM from one node to another node to balance the resource usage in a cluster. Often, system administrators of such distributed computing systems interact with the system (e.g., through a user interface) to specify their "intent" pertaining to the resource usage in the system. For example, a system administrator might specify an intent to instantiate 30 VMs for running a virtual desktop infrastructure (VDI) workload in a first processing environment and 20 VMs for running an SQL server workload in a second processing environment.

A failure of any sort (e.g., an instantiation failure or a resource allocation failure) at any of the selected processing environments can result in a disrupted and/or failed execution of the specified resource management operations as a whole. Such failures (e.g., processing environment failures such as a downed CPU or such as a downed network interface, etc.) can propagate additional failures (e.g., node failures, web server failures, web service failures, and/or other failures and/or combinations of failures). Certain types of "minor" failures might ripple through the system to cause "major" failures, which are then remediated by system administrators (e.g., by changing a parameter and/or restarting a script, and/or by redistributing the workload, and/or by manually carrying out various resource management tasks).

Unfortunately, leaving the remediation tasks to an administrator often causes outage periods, processing delays, and user dissatisfaction. What is needed is a way for the system to self-remediate, even without administrative intervention.

SUMMARY

The present disclosure provides a detailed description of techniques used in systems, methods, and in computer program products for executing resource management operations in distributed computing systems, which techniques advance the relevant technologies to address technological issues with legacy approaches. More specifically, the present disclosure provides a detailed description of techniques used in systems, methods, and in computer program products to achieve a low failure rate when executing resource management operations in distributed computing environments. Certain embodiments are directed to technological solutions for implementing fine-grained tracking of distributed resource management tasks to facilitate efficient redistribution of selected tasks in response to a processing environment failure.

The disclosed embodiments modify and improve over legacy approaches. In particular, the herein-disclosed techniques provide technical solutions that address the technical problems attendant to efficiently and reliably executing resource management operations in the presence of processing environment failures. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of computing platform management as well as advances in various technical fields related to massively parallel computing systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
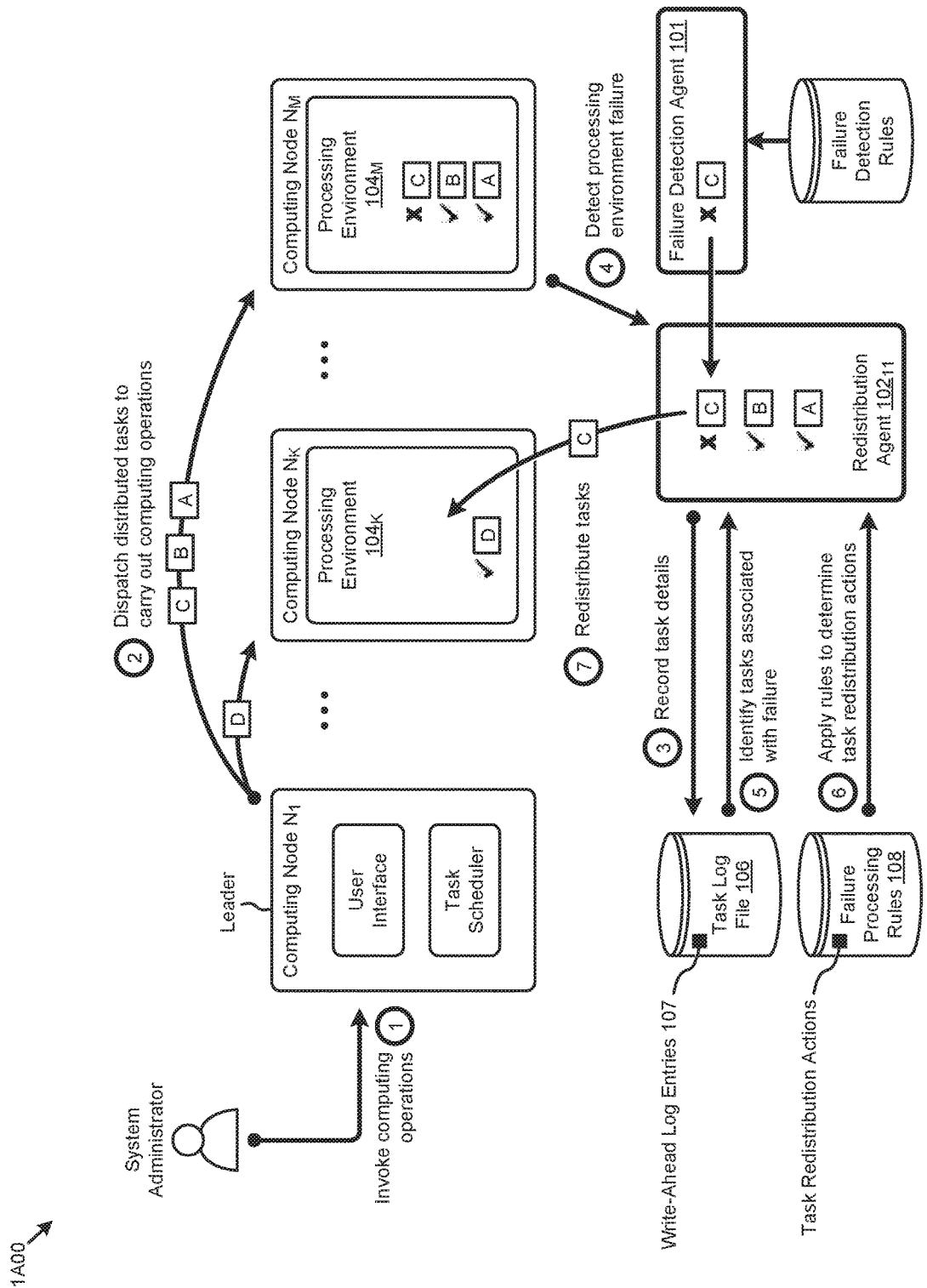
FIG. 1A depicts a computing operation execution technique as implemented in distributed computing systems, according to an embodiment.

Embodiments in accordance with the present disclosure address the problem of efficiently and reliably executing resource management operations in the presence of processing environment failures. Some embodiments are directed to approaches for implementing fine-grained tracking of distributed resource management tasks to facilitate efficient redistribution of selected tasks in response to a processing environment failure. The accompanying figures and discussions herein present example environments, systems, methods, and computer program products for achieving high rates of recovery when executing resource management operations in distributed computing environments.

Overview

Disclosed herein are techniques for implementing fine-grained tracking of distributed resource management tasks to facilitate efficient redistribution of selected tasks in response to a system, subsystem or component failure. In certain embodiments, various detailed attributes associated with a set of resource management tasks (e.g., web service requests) identified for carrying out a given resource management operation are stored in a task log. When a failure at a particular processing environment is detected, the task log is accessed to identify any tasks associated with the detected failure. A set of failure processing rules are applied to the detected failure and/or the identified tasks to invoke various task redistribution actions. In some embodiments, some tasks have a one-to-many (e.g., parent-child) relationship to other tasks. In some embodiments, the tasks are queued at a given processing environment based on a set of ordering rules. In some embodiments, one or more failure events are detected by a leader node.

The aforementioned embodiments address efficiencies that can be achieved when using with fine-grained, rule-based remediation. Specifically, disclosed herein are sets of fine-grained remediation rules which, when triggered and applied, serve to perform tasks such as automatically re-invoking a particular task or, automatically redistributing a particular task to another node or service. Such fine-grained remediation avoids costs and delays associated with administrative intervention.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1A depicts a computing operation execution technique 1A00 as implemented in distributed computing systems. As an option, one or more variations of computing operation execution technique 1A00 or any aspect thereof may be implemented in the context of the architecture and functionality of the embodiments described herein. The computing operation execution technique 1A00 or any aspect thereof may be implemented in any environment.

The computing operation execution technique 1A00 presented in FIG. 1A illustrates one embodiment of techniques for implementing fine-grained tracking of distributed resource management tasks to facilitate efficient redistribution of selected tasks in response to a processing environment failure. Such techniques described herein address the problems attendant to efficiently and reliably executing computing operations (e.g., resource management operations) in the presence of processing environment failures.

In many distributed computing environments (e.g., clustered computing environments), certain computing operations are executed by distributing various tasks across the computing system in such a way that system resources are most efficiently used. For example, as can be observed in FIG. 1A, a user (e.g., system administrator) might interact with a user interface at a computing node $N_1$ elected as a leader node from multiple nodes (e.g., computing node $N_1, \ldots,$ computing node $N_K, \ldots,$ computing node $N_M$) to invoke one or more computing operations (operation 1). A task scheduler at the leader node might apply various techniques (e.g., load balancing techniques) to determine the tasks and the processing environments to execute those tasks so as to carry out the computing operations (operation 2). For example, task A, task B, and task C might be dispatched to processing environment $104_M$ at computing node $N_M$, and task D might be dispatched to processing environment $104_K$ at computing node $N_K$.

In some cases, a failure at any of the selected processing environments can result in a disrupted and/or failed execution of one or more of the dispatched tasks and/or the invoked computing operations. The herein disclosed techniques can address issues associated with detected failures by implementing one or more instances of a redistribution agent (e.g., redistribution agent $102_{11}$) in the system. For example, in some embodiments, an instance of a redistribution agent might be implemented at each processing environment (e.g., node), and each node might further host a failure detection agent 101 which in turn can consult a set of failure detection rules. Such instances of the redistribution agent will record the task details of any tasks received in a given processing environment in task log file 106 (operation 3). At any moment in time, any actions taken during the foregoing processing might include formation of one or more write-ahead log entries 107 that characterize a command or action taken. A write-ahead log entry pertains to the invocation of a command or action taken. The success or failure of the command or action pertaining to the write-ahead log entry is processed in subsequent steps, such as when a failure of the particular command or action is detected.

When a failure at a processing environment (e.g., processing environment $104_M$) is detected (operation 4), task log file 106 is consulted to identify any tasks associated with the failure (operation 5).

For example, task log file 106 indicates that task A, task B, and task C are associated with processing environment $104_M$. A set of failure processing rules 108 are then applied by redistribution agent $102_{11}$ to the identified tasks to determine one or more task redistribution actions (operation 6). As an example, failure processing rules 108 might specify that no action is to be taken for tasks (e.g., task A and task B) that were completed at the time of failure, while tasks (e.g., task C) that were running or pending at the time of failure are to be redistributed. The redistributed tasks are then executed (operation 7) to facilitate completion of the earlier invoked computing operation, even in the presence of processing environment failures.

The elements of FIG. 1A can be implemented in a clustered computing environment. In particular, the shown computing nodes can each access a shared storage facility such as a storage pool. Furthermore, the shown computing nodes can each host a respective instance of a storage controller that accesses the aforementioned shared storage facility. Any node can communicate to any other node via its instance of the storage controller, and/or via data storage at the shared storage facility and/or can communicate with each other via a local area network. Further details pertaining to computing clusters are given below in the discussions of FIG. 6, FIG. 8A, FIG. 8B, and FIG. 8C, as well as in other places infra. The foregoing and subsequent discussions pertaining to clusters are non-limiting, and are provided merely for illustration. In particular, the disclosed techniques and configurations can be practiced in many different computing environments, including in computing environment that do not comport with the metes and bounds of a computing cluster.

Figure 1B:
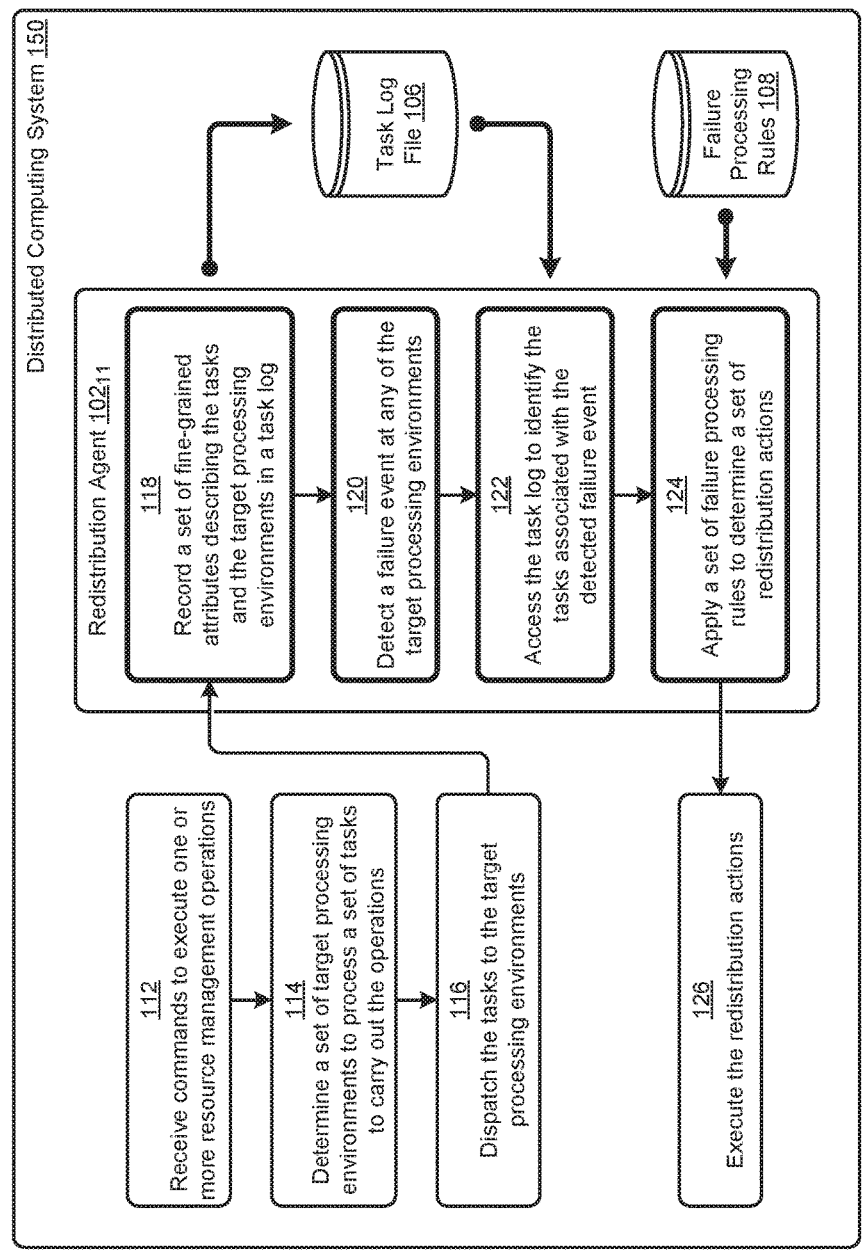
FIG. 1B depicts an execution failure remediation technique as implemented in distributed computing systems that exhibit low failure rates of resource management operations, according to an embodiment.

Further details describing embodiments of execution failure remediation techniques facilitated a redistribution agent are shown and described as pertaining to FIG. 1B.

FIG. 1B depicts an execution failure remediation technique 1B00 as implemented in distributed computing systems that exhibit low failure rates of resource management operations. As an option, one or more variations of execution failure remediation technique 1B00 or any aspect thereof may be implemented in the context of the architecture and functionality of the embodiments described herein. The execution failure remediation technique 1B00 or any aspect thereof may be implemented in any environment.

The embodiment shown in FIG. 1B is merely one example implementation of the herein disclosed techniques for remediating processing environment failures when executing computing operations (e.g., resource management operations) in distributed computing systems. Such computing operations are defined herein as high order requests to be carried out by a computing system to achieve a certain outcome (e.g., data response, data transformation, etc.). The computing operations might be invoked, for example, from a user interface (e.g., graphical user interface, command line interface, etc.) or a computer program (e.g., script, subroutine, function, etc.).

For example, a script might be executed to invoke a resource management operation to migrate a certain VM from one node to another node to balance the resource usage in the system. As another example, a system administrator might interact with a user interface to specify an "intent" pertaining to the resource usage in the system. In this case, clicking a "Submit" button, for example, might invoke multiple commands corresponding to one or several resource management operations, such as computing operations to instantiate 30 VMs for running a virtual desktop infrastructure (VDI) workload and 20 VMs for running an SQL server workload.

In many cases, the computing operations are executed by processing a set of tasks. The tasks are units of work (e.g., units of execution) invoked to achieve the outcome of an associated operation or set of operations. The tasks might be executed by calls (e.g., HTTP requests) to web services, subroutines, tasks, and/or other computing entities. As an example, a resource management operation to create a VM might be carried out by multiple tasks that each call web services to (a) create a virtual network interface card (NIC), (b) create a storage volume group, (c) create the VM, (d) attach the storage volume, and (e) attach the virtual NIC.

Referring again to FIG. 1B, execution failure remediation technique 1B00 indicates that commands to execute one or more resource management operations can be received at distributed computing system 150 (step 112). The system determines a set of target processing environments to process a set of tasks to carry out the operations (step 114). The tasks are then dispatched to the target processing environments for processing (step 116). As shown, an instance of redistribution agent $102_{11}$ (e.g., at each target processing environment) intercepts the incoming tasks to record a set of fine-grained attributes describing the tasks and the target processing environments in the task log file (step 118). The redistribution agent $102_{11}$ also serves to detect failure events at any of the target processing environments (step 120). Responsive to such failure events, redistribution agent $102_{11}$ accesses stored task data (e.g., task log file 106) to identify any tasks associated with the detected failure event (step 122). A set of failure processing rules 108 are applied to the identified tasks to determine a set of task redistribution actions (step 124). For example, failure processing rules 108 might specify actions for running or pending tasks at a given failed environment to redistribute the tasks to another available (e.g., live) processing environment. The resulting actions can be issued to distributed computing system 150 for execution (step 126).

Various techniques can be implemented to facilitate detection of failure events by the redistribution agent. One such technique implements a resource registry to track the status of resources, as shown and described as pertaining to FIG. 2A.

Figure 2A:
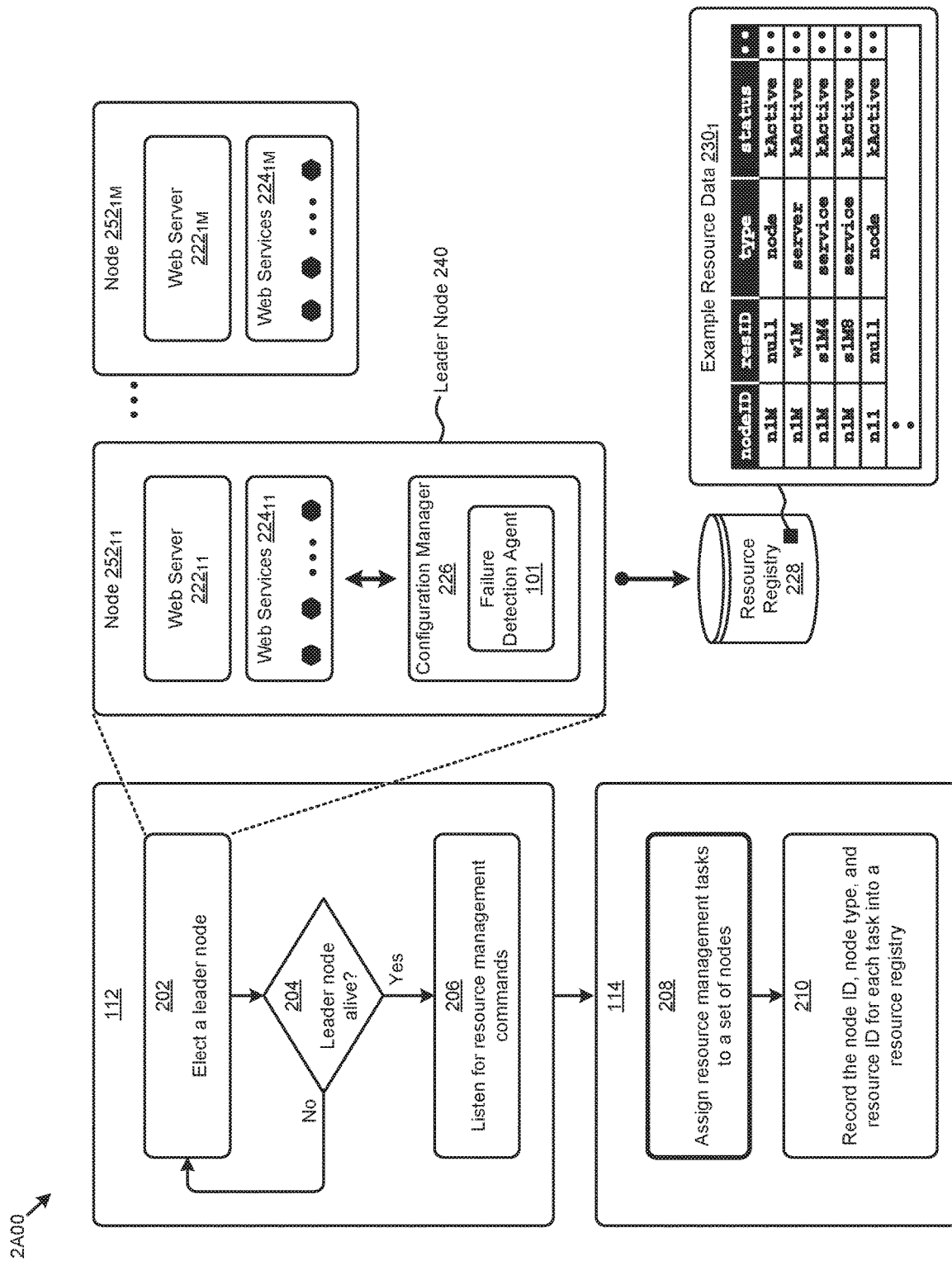
FIG. 2A illustrates a processing environment registration technique as implemented in systems that protect against failed execution of resource management operations in distributed computing environments, according to an embodiment.

FIG. 2A illustrates a processing environment registration technique 2A00 as implemented in systems that protect against failed execution of resource management operations in distributed computing environments. As an option, one or more variations of processing environment registration technique 2A00 or any aspect thereof may be implemented in the context of the architecture and functionality of the embodiments described herein. During processing of the shown flow a leader task is identified, then the leader task dispatches resource management commands to target processing environments, which dispatched resource management commands are registered for tracking and subsequent reference. The processing environment registration technique 2A00 or any aspect thereof may be implemented in any environment.

Shown in FIG. 2A is one embodiment of various steps and/or operations to track the status of various resources in a distributed computing system to facilitate the herein disclosed techniques according to some embodiments. Certain specialized data structures that are designed to improve the way a computer stores and retrieves data in memory when performing such steps and/or operations are also shown.

The shown embodiment depicts two representative nodes (e.g., node $252_{11}$ and node $252_{1M}$) in a distributed computing system. According to the processing environment registration technique 2A00, the system might elect a leader node from among some or all of the nodes in the system (step 202). For example, node $252_{11}$ might be elected as the leader node 240. When alive (see "Yes" path of decision 204), the leader node can perform certain functions designated for the leader node. For example, the leader node can receive all computing or resource management operation commands (step 206) and distribute the commands and/or underlying tasks to various target processing environments (e.g., other nodes). If the leader node fails (see "No" path of decision 204), a new leader is automatically elected.

As can be observed, running at each node are a web server (e.g., web server $222_{11}$ and web server 2221M, respectively) and a corresponding set of web services (e.g., web services $224_{11}$ and web services 2241M, respectively). The web services stack comprising the web server and web services can represent the resources comprising the processing environment of each node. Such resources can be dispatched to the nodes to process various resource management tasks (step 208). When each of the resources is assigned, dispatched and invoked (e.g., installed and booted, instantiated and started, etc.), it is registered (step 210) and monitored. The configuration manager tracks system resources to record certain details pertaining to each resource in resource registry 228. In one example embodiment, the configuration manager 226 within leader node 240 can employ monitoring services, such as a failure detection agent. Two or more configuration managers might run on multiple nodes in the distributed computing system to maintain high reliability access to the resource registry. The resource information in resource registry 228 is organized and/or stored in a specialized data structure having entries corresponding to a particular resource. Each entry has fields corresponding to various attributes pertaining to that resource. For example, as depicted in example resource data $230_1$, a data structure entry might describe a node identifier or "nodeID", a resource identifier or "res ID", a resource "type", a resource "status" (e.g., "kActive", "kFailed", etc.), and/or other attributes. Strictly for illustration, the example resource data $230_1$ shows a resource "s1M8" at node "n1M" is a "service" that is then-currently "kActive".

Figure 2B:
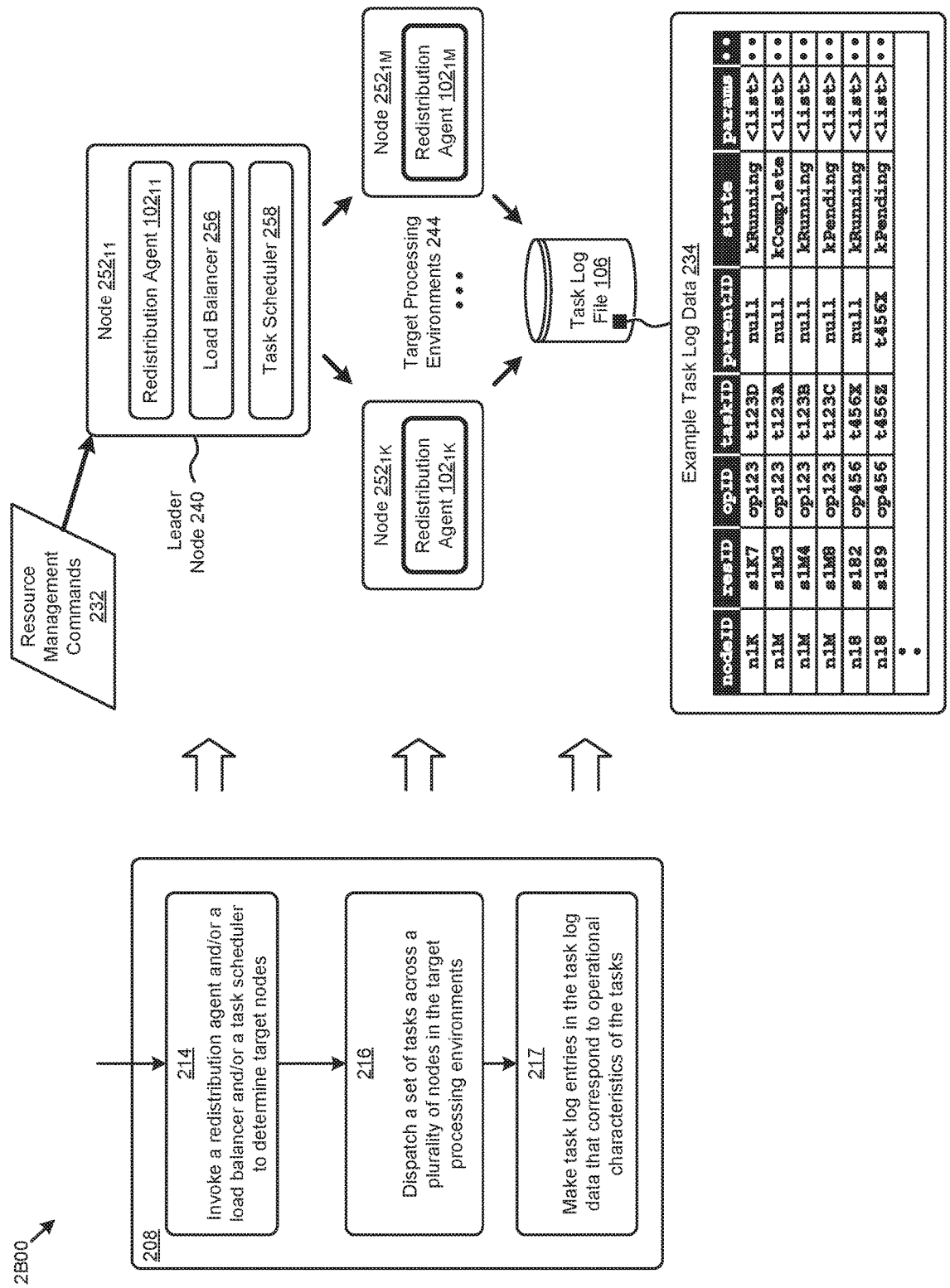
FIG. 2B depicts a resource management operation execution technique as implemented in systems that protect against failed execution of resource management operations in distributed computing environments, according to an embodiment.

Configuration manager 226 and other agents within the leader node and throughout the distributed computing system can perform other functions according to the herein disclosed techniques as shown and described as pertaining to FIG. 2B.

FIG. 2B depicts a resource management operation execution technique 2B00 as implemented in systems that protect against failed execution of resource management operations in distributed computing environments. As an option, one or more variations of resource management operation execution technique 2B00 or any aspect thereof may be implemented in the context of the architecture and functionality of the embodiments described herein. The resource management operation execution technique 2B00 or any aspect thereof may be implemented in any environment.

FIG. 2B depicts one embodiment of various steps and/or operations to record fine-grained task attributes when executing resource management operations in distributed computing systems according to the herein disclosed techniques. Certain specialized data structures that are designed to improve the way a computer stores and retrieves data in memory when performing such steps and/or operations are also shown.

The shown embodiment depicts three representative nodes (e.g., node $252_{11}$, node $252_{1K}$, and node $252_{1M}$) in a distributed computing system. An instance of a redistribution agent (e.g., redistribution agent $102_{11}$, redistribution agent $102_{1K}$ and redistribution agent $102_{1M}$) is instantiated at each node according to some embodiments. The resource management operation execution technique 2B00 can commence by receiving one or more resource management commands to execute one or more resource management operations (e.g., from step 112 of FIG. 1B). As earlier described, leader node 240 (e.g., node $252_{11}$) can be elected to receive resource management commands 232 and serve as a redistribution agent. In some cases, a redistribution agent at leader node 240 works in conjunction with a load balancer 256 and a task scheduler 258 to determine a task schedule to achieve the desired outcomes corresponding to the resource management operations (step 214). As shown, the task scheduler 258 can dispatch a set of tasks to one or more target processing environments according to any particular task scheduling algorithm such as shortest jobs first scheduling, or round-robin scheduling, etc. (step 216). The task scheduler can operate in any environments that are composed of any number and/or configuration of nodes. For example, and as shown, the target processing environments 244 might comprise node $252_{1K}$ and node $252_{1M}$ and/or other nodes. Log data corresponding to the scheduling (e.g., timings and assignments to nodes) of the dispatched tasks are stored (at step 217) in a logging facility. On an ongoing basis, tasks are monitored and failures are detected. Techniques for detecting processing environment failures is shown and described as pertaining to FIG. 3A and FIG. 3B.

Figure 3A:
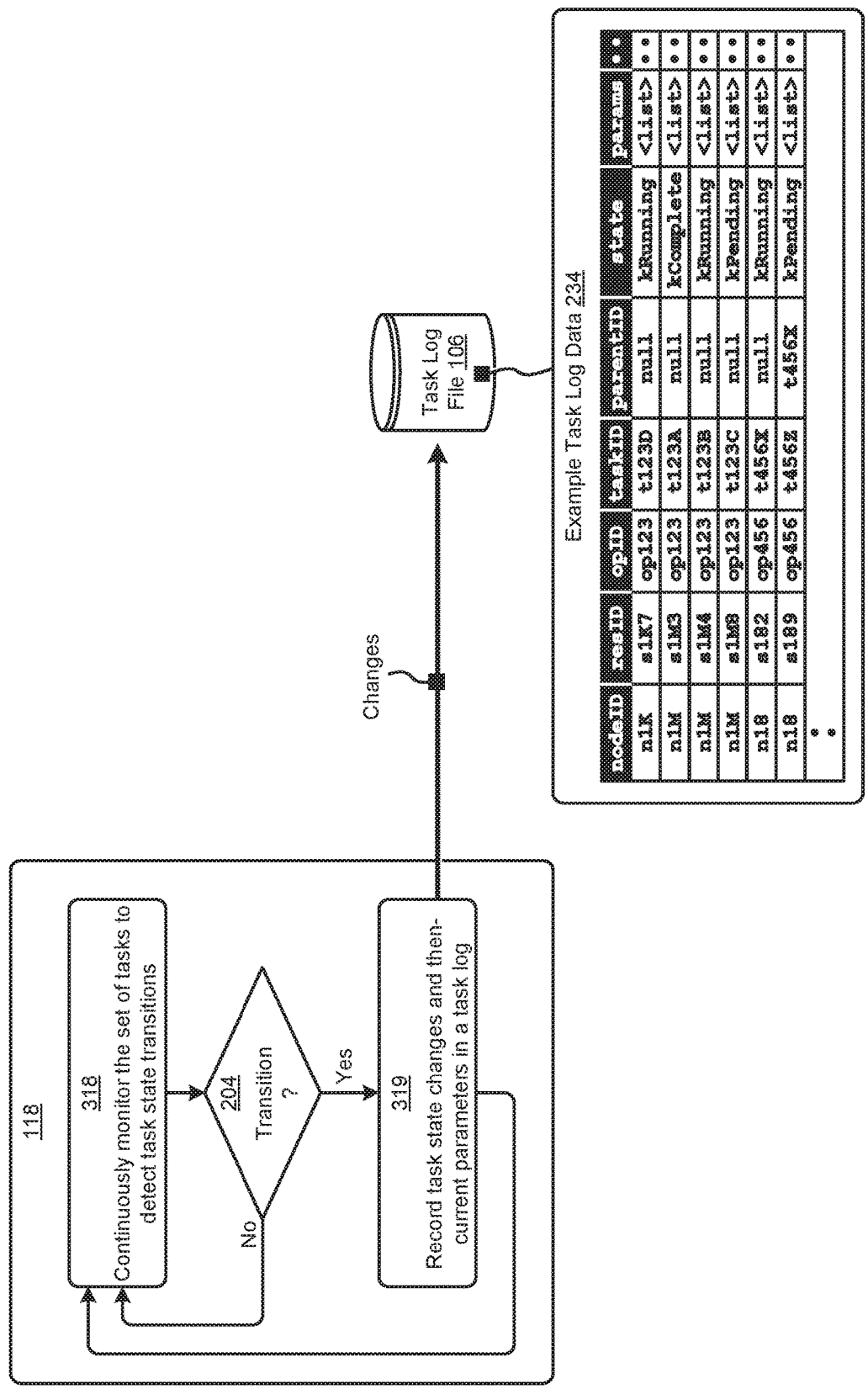
FIG. 3A and FIG. 3B illustrate failure detection techniques as implemented in systems that protect against the effects of failed resource management operations in distributed computing environments, according to an embodiment.
Figure 3B:
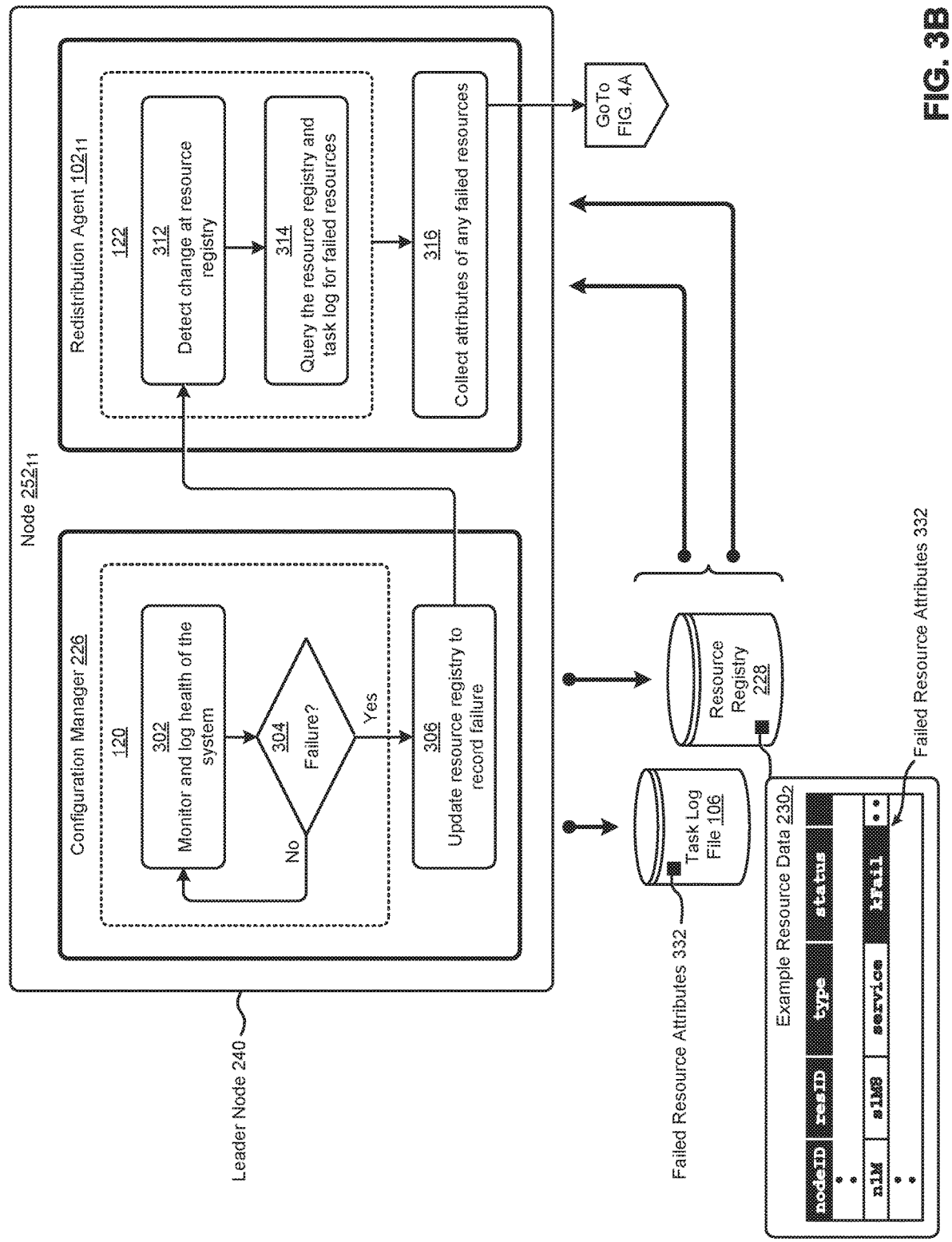

FIG. 3A and FIG. 3B illustrate failure detection techniques as implemented in systems that protect against the effects of failed resource management operations in distributed computing environments. As an option, one or more variations of failure detection techniques or any aspect thereof may be implemented in the context of the architecture and functionality of the embodiments described herein. The failure detection techniques or any aspect thereof may be implemented in any environment.

The instances of the redistribution agent (e.g., redistribution agent $102_{1K}$ and redistribution agent $102_{1M}$) at each target processing environment will record a set of fine-grained attributes describing the tasks issued to each respective target processing environment. Specifically, the tasks are continuously monitored (step 318) using any known techniques (e.g., by an operating system kernel). When certain task state changes are detected, the change is logged (step 319).

As shown, the task attributes can be stored in task log file 106. In some embodiments, the task log file 106 is replicated in a storage pool across the distributed computing system to provide high reliability and availability access to authorized entities. The task attribute data in task log file 106 are often organized and/or stored in a tabular structure (e.g., relational database table) having rows corresponding to a particular task and columns corresponding to various attributes pertaining to that task. For example, as depicted in example task log data 234, a table row might describe a processing environment identifier (e.g., node identifier) or "nodeID", a processing resource identifier or "resID", a computing operation identifier or "opID", a task identifier or "taskID", a parent task or operation identifier or "parentID", a task "state", a list of task parameters or "params", and/or other attributes. For example, a task "t123C" associated with operation "op123" is dispatched for processing to resource "s1M8" at node "n1M" and has a then-current "kPending" status.

The "parentID" attribute is included in the example task log data 234 to uniquely identify a task that spawns one or more children tasks. For example, a certain parent web service request and associated list of "params" might spawn a set of child requests to other web services having respective lists of "params" constructed from the parent "params" and/or other information. In some cases, a given task has no parent (e.g., "parentID"="null"). The task attributes stored in task log file 106 are described as "fine-grained" in part, since they track such parent-child relationships (e.g., one-to-many relationships). As such, the herein disclosed techniques can facilitate efficient remediation of processing environment failures in cases where various combinations of child tasks for a given parent are associated with a failed processing environment.

The fine-grained characteristic of the task log data facilitates efficient remediation of processing environment failures in cases where merely a portion of a given processing environment fails. For example, a single web service from a plurality of web services at a particular computing node might fail while the other web services and node comprising the processing environment remain active. In such cases, the herein disclosed techniques can facilitate redistribution of the incomplete tasks associated with the failed web service while continuing execution of any other tasks as earlier scheduled.

A state transition might be indicative of a failure, or a state transition might be a 'normal' state transition. The following FIG. 3B shows and discusses techniques to detect failures of resources using the health monitor of a leader node.

As shown in the embodiment of FIG. 3B, the failure detection technique is performed at least in part by an instance of a configuration manager (e.g., configuration manager 226) and by an instance of a redistribution agent (e.g., redistribution agent $102_{11}$) that are implemented within leader node 240 (e.g., node $252_{11}$).

Configuration manager 226 servers to continually monitor the health of system resources (step 302). If there are no health changes, such as a resource failure (see "No" path of decision 304), configuration manager 226 continues to monitor the system health. If a failure is detected (see "Yes" path of decision 304), an updated status of the resources associated with the failure is recorded in resource registry 228 (step 306). For example, if the service "s1M8" (e.g., web service) at node "n1m" fails, its status will be updated to "kFail" as shown in the example resource data 2302.

The redistribution agent $102_{11}$ at the leader node 240 monitors the resource registry to detect any changes (step 312). When a change is detected, redistribution agent $102_{11}$ queries the resource registry 228 and/or the task log file 106 to identify any failed resources (step 314). For example, resource registry 228 can be queried for "status='kFail'" to return all failed resources. The attributes of any failed resources returned by the query are collected by the redistribution agent $102_{11}$ (step 316). In the foregoing example, such a query might return a set of failed resource attributes 332 associated with service "s1M8" (e.g., "nodeID='n1M'", "resID='s1M8'", "type='service'", "status=kFail", etc.).

As can be observed, the resource attributes (e.g., failed resource attributes 332) in resource registry 228 can be organized and/or stored in key-value pairs, where the "key" is the resource attribute or element of the attribute and the "value" is the data element (e.g., number, character string, array, etc.) associated with the attribute or attribute element. In some cases, the key-value pairs can be used to store and/or communicate the resource attribute data in a structured object form (e.g., JSON, XML, etc.) for various purposes. For example, in some embodiments, the key-value pairs describing the failed resource attributes can be used by the redistribution agent to determine a set of task redistribution actions in response to a processing environment failure as shown and described as pertaining to FIG. 4A.

Figure 4A:
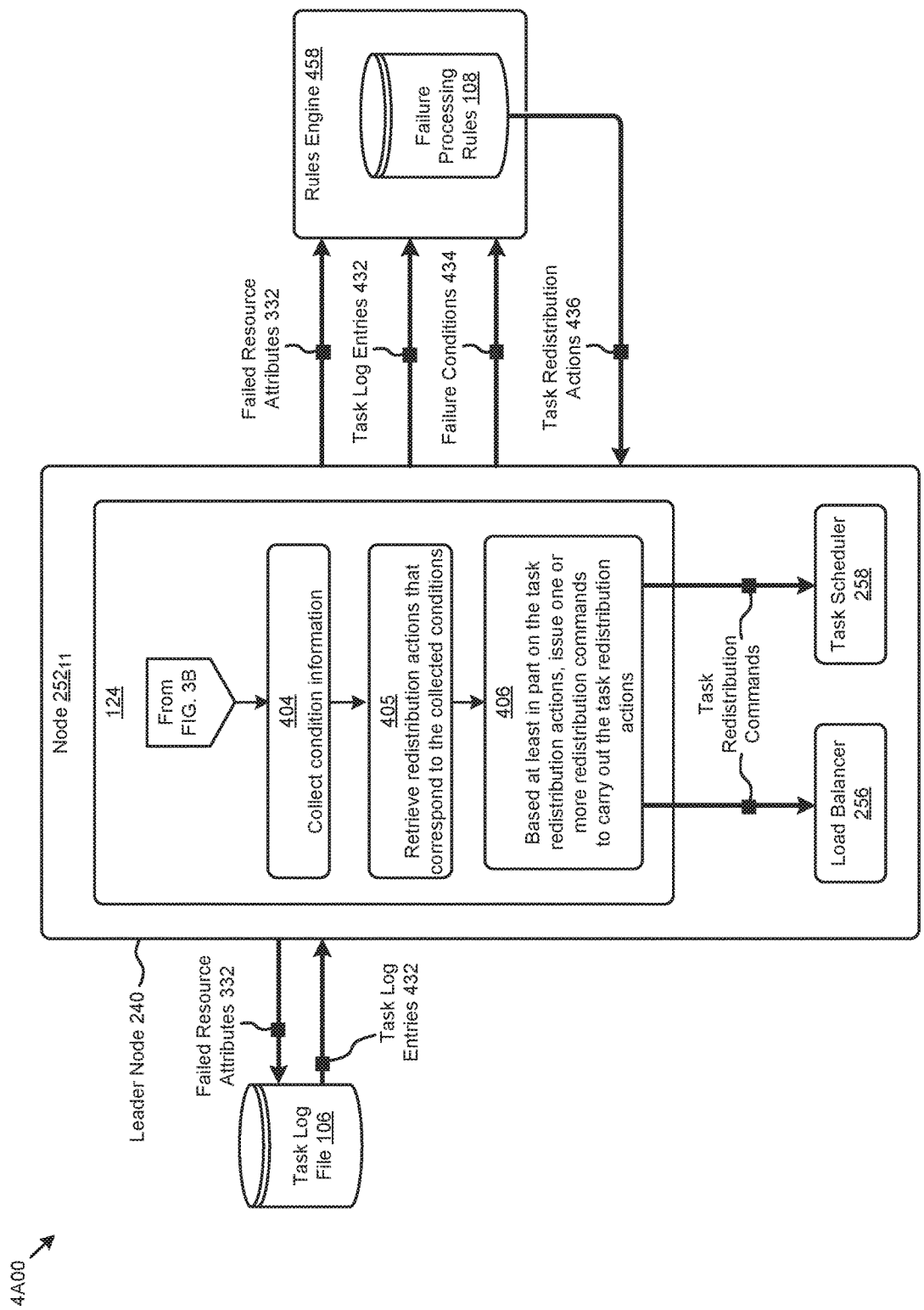
FIG. 4A depicts a task redistribution technique as implemented in systems that protect against failed execution of resource management operations in distributed computing environments, according to an embodiment.

FIG. 4A depicts a task redistribution technique 4A00 as implemented in systems that protect against failed execution of resource management operations in distributed computing environments. As an option, one or more variations of task redistribution technique 4A00 or any aspect thereof may be implemented in the context of the architecture and functionality of the embodiments described herein. The task redistribution technique 4A00 or any aspect thereof may be implemented in any environment.

FIG. 4A depicts merely one example of various steps and/or operations performed by a redistribution agent to redistribute tasks in response to one or more task processing resource failures according to the herein disclosed techniques. Leader node 240 (e.g., node 252$_{11}$) uses a set of failed resource attributes 332 to query the task log file 106 so as to collect task log entries of any tasks associated with any task processing resource failures. For example, redistribution agent 102$_{11}$ might use failed resource attributes 332 (e.g., as earlier described as pertaining to step 316 of FIG. 3B) to collect task log entries 432 of any tasks associated with the failed service "s1M8".

A rules engine 458 accesses a set of failure processing rules 108. The failure processing rules are applied to failure conditions 434, task log entries 432, and/or failed resource attributes 332 and/or other input information (e.g., resource data, system conditions, etc.) to collect (at step 404) a set of then-current conditions of the computing system. At step 405, any one or more redistribution actions that correspond to the then-current conditions are retrieved. In some cases, a rules engine serves to process retrievals.

Having the one or more redistribution actions (e.g., from step 405), step 406 serves to issue one or more redistribution commands to the system to carry out the task redistribution actions 436. For example, and as shown, commands to execute task redistribution can be issued to load balancer 256 and/or to task scheduler 258.

As a further illustration of how failure processing rules 108 are applied, consider a set of tasks that are distributed to a computing node to be carried out, where the tasks comprise (1) create a vDisk, (2) create a virtual NIC (vNIC), (3) create a VM, and (4) attach the vNIC and vDisk to the VM. Further consider a case that at some moment in time after the vDisk and vNIC had been successfully created, the VM creation fails. A failure detection agent consults with a set of failure detection rules, and based on such rules (e.g., rules that process task or operation errors or timeout conditions), the failure detection agent raises an error detection indication. In such a case, failure processing rules 108 might include a rule that is codified syntactically to reflect the semantics of "Conditions: When a grouped intent task fails or times out, then invoke an intent engine management plug-in to clean up the just-created vNIC and clean up the just created vDisk, then assign the group of intent tasks to a new node."

The foregoing is merely one example, of applying a failure processing rule. Further details describing techniques for applying various failure processing rules to determine task redistribution actions are shown and described as pertaining to FIG. 4B.

Figure 4B:
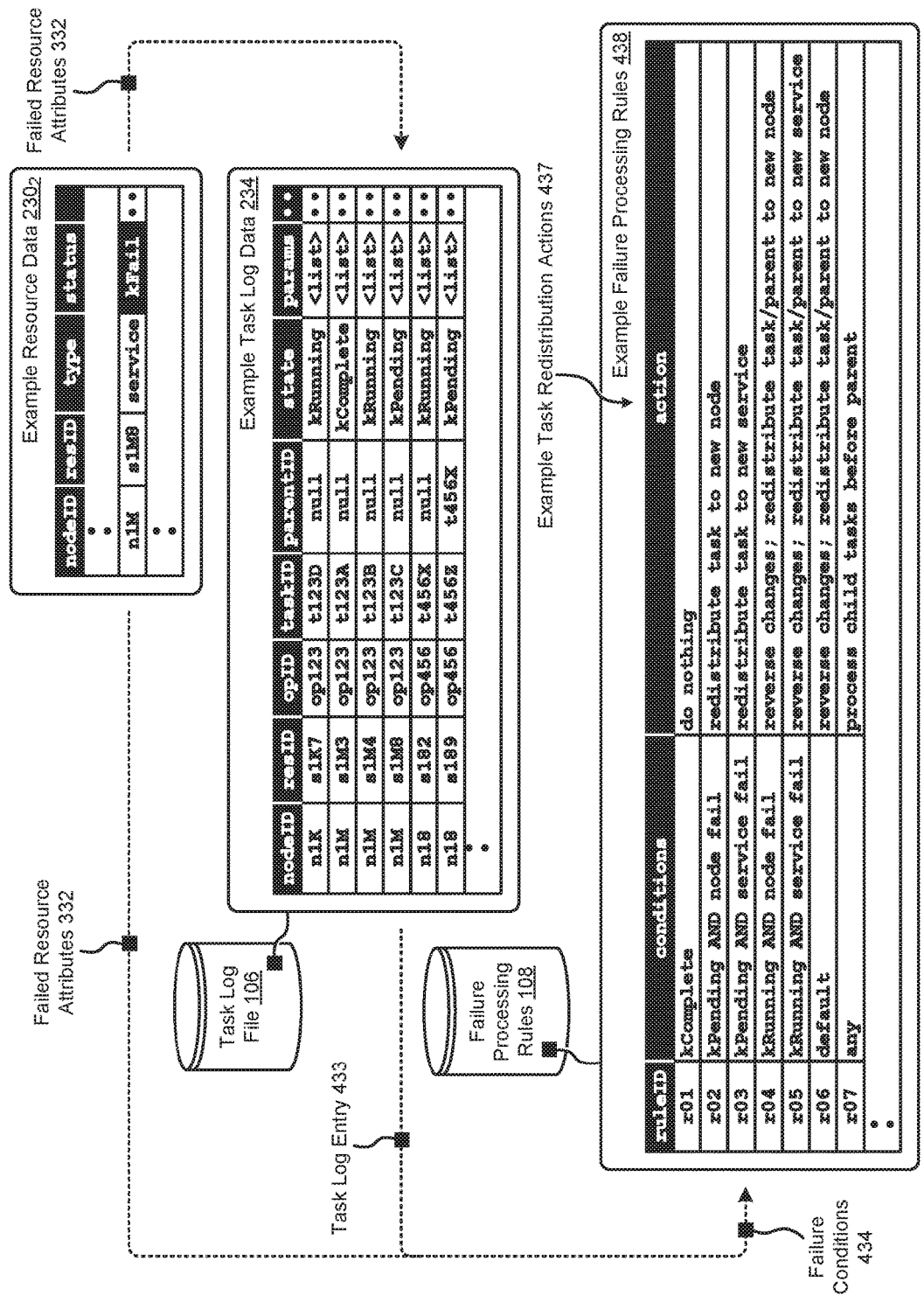
FIG. 4B depicts a failure processing rule application technique as implemented in systems that protect against failed execution of resource management operations in distributed computing environments, according to an embodiment.

FIG. 4B depicts a failure processing rule application technique 4B00 as implemented in systems that protect against failed execution of resource management operations in distributed computing environments. As an option, one or more variations of failure processing rule application technique 4B00 or any aspect thereof may be implemented in the context of the architecture and functionality of the embodiments described herein. The failure processing rule application technique 4B00 or any aspect thereof may be implemented in any environment.

FIG. 4B depicts specialized data structures designed to improve the way a computer stores and retrieves data in memory when performing steps pertaining to low failure execution of resource management operations in distributed computing environments, according to the herein disclosed embodiments.

Specifically shown are example resource data 2302, example task log data 234 (e.g., selected from task log file 106), and example failure processing rules 438. A rule base, such as failure processing rules 108, comprise data records storing various information (e.g., in the form of failure processing rules) that can be used to form conditions, constraints, and actions to be taken when the conditions evaluate to TRUE. In addition to determination of then-current conditions evaluating to TRUE, the actions to be taken might apply only to certain functions and/or operations. For example, a failure processing rule might specify a set of failure conditions that, if matched by the attributes describing a certain resource and/or processing environment failure, then select a corresponding set of task redistribution actions to perform. In this case, the information pertaining to a failure processing rule might comprise conditional logic operators (e.g., "IF", "THEN", "AND", "OR", "GREATER THAN", "LESS THAN", etc.) and/or operand references for forming a conditional logic statement that can be applied to various sets of operands.

Failure processing rules 108 are often organized and/or stored as programming code objects that receive input parameters (e.g., failure conditions) that are used to determine certain recovery actions to take. For illustrative purposes, example failure processing rules 438 describe a set of representative input conditions (e.g., the shown "conditions") and a set of corresponding recovery actions (e.g., the shown "actions"). As an example, rule "r03" indicates that a "kPending" task associated with a "service fail" results in invoking an action to "redistribute task to new service". Or, as another example, rule "r03" is triggered when the conditions "kPending AND service fail" are present. The triggering of that rule results in invoking one or more actions to redeploy the service "s1M8" (e.g., as pertaining to the example task redistribution actions 437).

As shown in FIG. 4B, a set of failed resource attributes 332 describing the failed service "s1M8" on node "n1m" can be used to identify a task "t123C" that is dispatched to call this service. As indicated in the shown example task log data 234, the then-current state of task "t123C" is "kPending", representing that task "t123C" may have been queued for processing at the time of the failure. A set of failure conditions 434 comprising the task log information (e.g., task log entry 433) associated with task "t123C" from task log file 106, together with failed resource attributes 332, and/or other information serve as inputs to failure processing rules 108. Given such information as inputs, application of the failure processing rules can emit one or more task redistribution actions. Specifically, the shown failure conditions match the conditions of rule "r03" indicating that task "t123C" will be redistributed to a new service according to one or more of the task redistribution actions 437 that correspond to rule "r03". The shown redistribution actions are merely examples. In addition to the shown redistribution actions, recovery actions comprise any sets of time-ordered sequence of actions, such as reversing previously taken actions, discarding pending or not yet committed actions, redistributing a task to a service on a different node, redistributing a task to a different service, or performing a change reversal by reverting to a previously validated success point. Moreover, the foregoing failure processing rules can be triggered and applied to as many failures as are detected at any moment in time.

Figure 5:
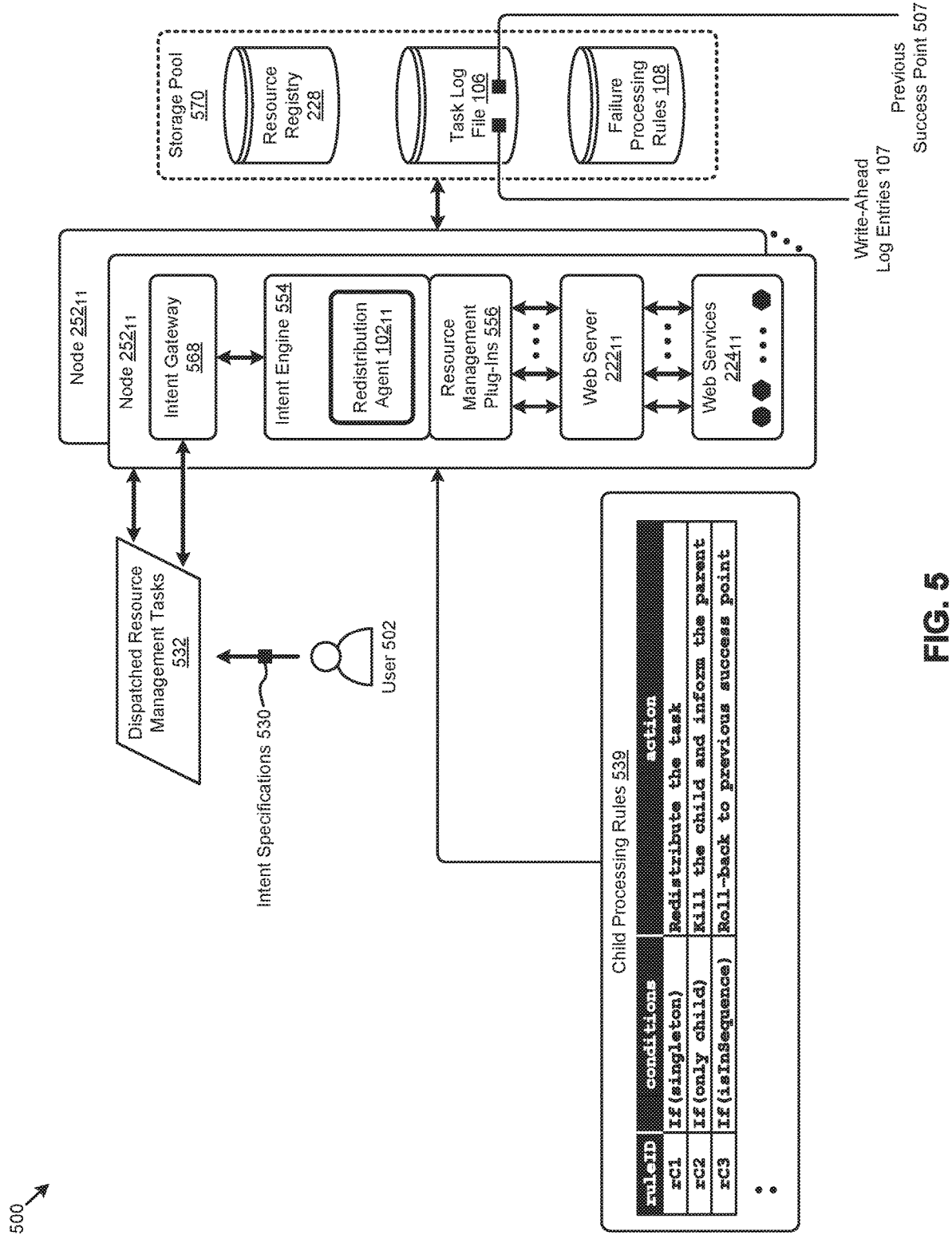
FIG. 5 presents a computing environment having components that interoperate to protect against failed execution of resource management operations in distributed computing environments, according to an embodiment.

One embodiment of a subsystem and corresponding data flows for implementing any of the herein disclosed techniques is shown and described as pertaining to FIG. 5.

FIG. 5 presents a computing environment 500 having components that interoperate to protect against failed execution of resource management operations in distributed computing environments. The computing environment 500 shown in FIG. 5 is merely one example of components and data flows implemented in a distributed computing system to support any of the herein disclosed techniques. As can be observed, computing environment 500 comprises multiple nodes (e.g., node $252_{11}$, ..., node $252_{1M}$) that each supports an instance of the redistribution agent implemented in an intent engine. For example, redistribution agent $102_{11}$ is implemented in intent engine 554 at node $252_{11}$. A user 502 (e.g., system administrator) and/or other components in computing environment 500 can interact with intent engine 554 through intent gateway 568. As an example, user 502 might create a set of intent specifications 530 that characterize an intended use (e.g., 30 VMs for running a VDI workload, 20 VMs for running an SQL server workload, etc.) of the resources at the nodes in the system. As earlier described, the resource operations to deploy the intent specification can be executed using a set of tasks that are dispatched to various processing environments (e.g., nodes) in computing environment 500. As shown, a portion of a set of dispatched resource management tasks 532 might be received at intent gateway 568 at node $252_{11}$.

While the redistribution agents at each node in the computing environment perform various operations pertaining the dispatched tasks as described herein, the intent engine 554 communicates with a set of resource management plug-ins 556 coupled to intent engine 554 to execute the dispatched tasks. For example, each plug-in from resource management plug-ins 556 is invoked to process a particular task or set of tasks. For example, one plug-in might be used to create a VM while another plug-in might be used to create an application container. As further shown, resource management plug-ins 556 might process various task by issuing calls (e.g., web service requests) to various web services (e.g., web services $224_{11}$) through a local instance of a web server (e.g., web server $222_{11}$).

Strictly as further examples of possible functions of resource management plug-ins, a plug-in might be coupled to intent engine 554 to determine how to handle various failure situations involving master-slave or parent-child relationships between tasks. Scenarios involving swarms of child tasks can be handled using child processing rules 539. For example, if the failed task is a singleton (i.e., has no children), then rule "rC1" might fire, which would merely redistribute the task to an available node. As another example, if the failed task is an only child, then rule "rC2" might fire, which would serve to kill the failed child and inform the parent.

Again referring to the foregoing illustration of how failure processing rules are applied, consider a master task (e.g., a parent task) that spawns subordinate (e.g., child) tasks that are distributed to computing nodes to be carried out in a sequence of spawning operations. Consider an example where the subordinate tasks are sequenced as (1) create a vDisk, (2) create a virtual NIC (vNIC), (3) create a VM, and (4) attach the vNIC and vDisk to the VM. Further consider a set of conditions where at some moment in time after the vDisk and vNIC had been successfully created, the VM creation task fails. A failure detection agent detects the failure and consults with the foregoing failure detection rules. In this example, the failure processing rule "rC3" might determine that the task to "create a VM" was a particular task in a sequence of tasks. Application of rule "rC3" would then rollback to the previous success point 507 (e.g., before the VM creation failure) and cause initiation of a retry. A retry might be attempted using a different target node.

Regarding rollback to a previous success point, such a previous success point can be determined using log entries. Specifically, the aforementioned task log file 106 might contain occurrences of write-ahead log entries 107 that refer to spawned tasks and their spawned tasks and so on. Specific entries can be tagged with information that characterizes the nature of the entry, and whether or not the entry is considered a rollback checkpoint, for consideration when locating a prior success point.

In some cases, such as in a map-reduce scenario, a master task spawns many child tasks. Suppose that one of the child tasks experiences some sort of failure, and that the particular failure encountered by a child task is detected. In such as case, the task log can be processed (e.g., in reverse time order) until a non-failure checkpoint entry such as the entry corresponding to the earlier launch of the master task is encountered. Various tagging techniques can be employed such that, in the case of a failed child task, the child tasks are not tagged with a non-failure checkpoint indication, rather the rollback action might deem only the master task to hold a valid success point. As such, information pertaining to the checkpoint as well as any other then-current information available in the system can be considered as to whether or not a particular checkpoint can serve as a success point. If so, then the rollback action taken might be to set a log redo pointer to just before the checkpoint pertaining to the spawning of the master task. Before running the log redo actions, steps can be taken to ensure that the both the master task as well as any child tasks that were spawned by the master task are "killed", and that any resources that were allocated by the master task and/or child tasks have been or will be released.

The foregoing failure processing rules, including any child processing rules 539 as well as any of the various data stores and data sources (e.g., resource registry 228, task log file 106, failure processing rules 108, etc.) used by the herein disclosed techniques, can be stored in storage pool 570 for access by all authorized resources (e.g., nodes) in computing environment 500.

The components and data flows shown in FIG. 5 present merely one partitioning and associated data manipulation approach. The specific example shown is purely exemplary, and other subsystems and/or partitionings are reasonable. An example of a distributed virtualization environment (e.g., a hyperconverged distributed computing environment) that supports such components, data flows, and/or partitionings according to the herein disclosed techniques are presented and discussed as pertains to FIG. 6.

Figure 6:
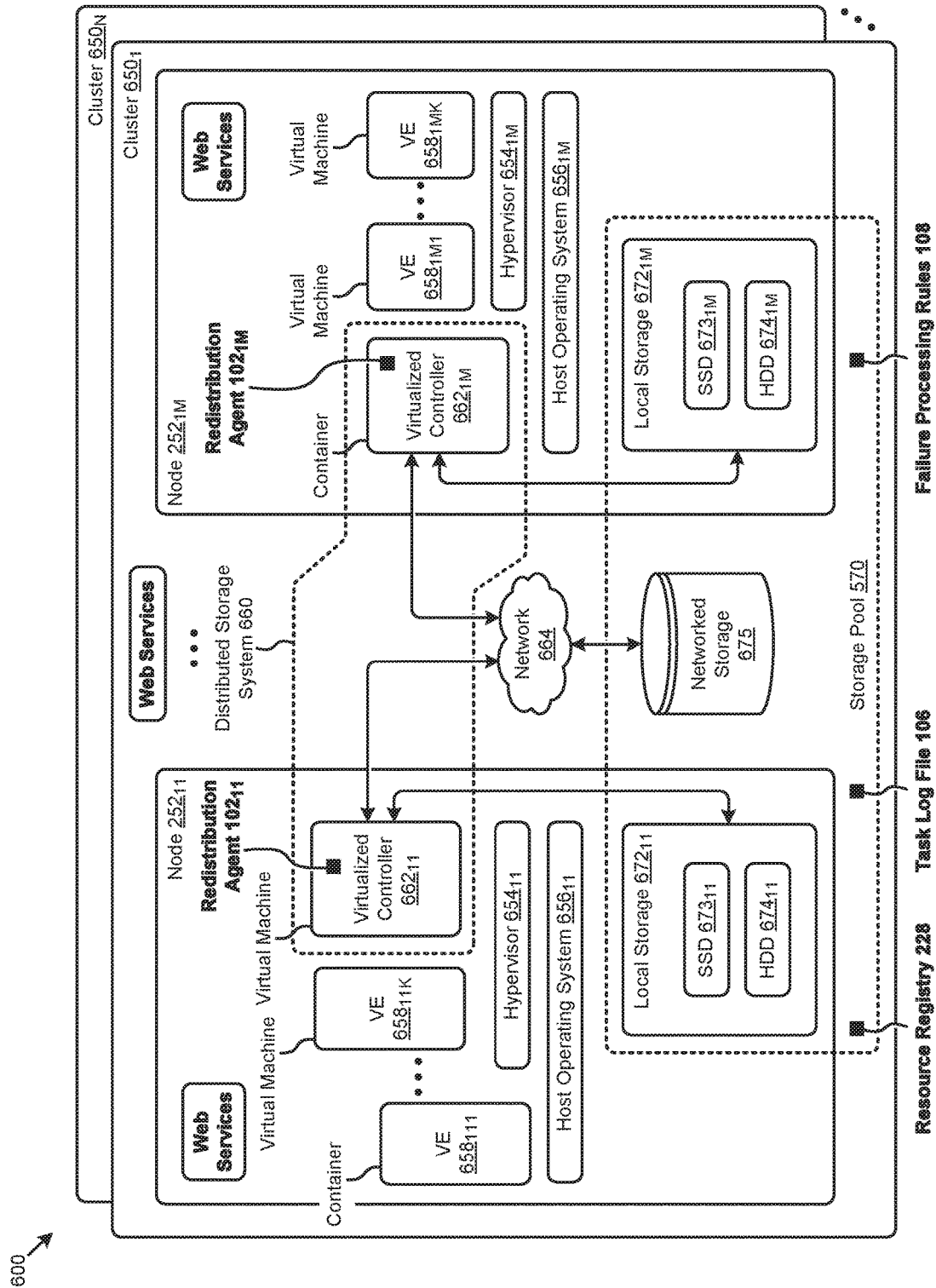
FIG. 6 presents a distributed virtualization environment in which embodiments of the present disclosure can operate.

FIG. 6 presents a distributed virtualization environment 600 in which embodiments of the present disclosure can operate. As an option, one or more variations of distributed virtualization environment 600 or any aspect thereof may be implemented in the context of the architecture and functionality of the embodiments described herein.

The shown distributed virtualization environment depicts various components associated with one instance of a distributed virtualization system (e.g., a clustered computing system) comprising distributed storage system 660 that can be used to implement the herein disclosed techniques. Specifically, the distributed virtualization environment 600 comprises multiple clusters (e.g., cluster $650_1$, ..., cluster $650_N$) comprising multiple nodes that have multiple tiers of storage in a storage pool. Representative nodes (e.g., node $252_{11}$, ..., node $252_{1M}$) and storage pool 570 associated with cluster $650_1$ are shown. Each node can be associated with one server, multiple servers, or portions of a server. The nodes can be associated (e.g., logically and/or physically) with the clusters. As shown, multiple tiers of storage include storage that is accessible through network 664, such as networked storage 675 (e.g., a storage area network or SAN, a network attached storage or NAS, etc.). The multiple tiers of storage further include instances of local storage (e.g., local storage $672_{11}$, ..., local storage $672_{1M}$). For example, the local storage can be within or directly attached to a server and/or appliance associated with the nodes. Such local storage can include solid state drives (SSD $673_{11}$, ..., SSD $673_{1M}$), hard disk drives (HDD $674_{11}$, ..., HDD $674_{1M}$), and/or other storage devices.

As shown, the nodes in distributed virtualization environment 600 can implement one or more user virtualized entities (e.g., VE $658_{111}$, ..., VE $658_{11K}$, ..., VE $658_{1M1}$, VE $658_{1MK}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $656_{11}$, ..., host operating system $656_{1M}$), while the VMs run multiple applications on various respective guest operating systems. Such flexibility can be facilitated at least in part by a hypervisor (e.g., hypervisor $654_{11}$, hypervisor $654_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $656_{11}$, ..., host operating system $656_{1M}$) without, in most cases, a hypervisor layer. This lightweight implementation can facilitate efficient distribution of certain software components, such as applications or services (e.g., micro-services). As shown, distributed virtualization environment 600 can implement both a hypervisor-assisted virtualization environment and a container virtualization environment for various purposes.

Distributed virtualization environment 600 also comprises at least one instance of a virtualized controller to facilitate access to storage pool 570 by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a hypervisor).

Multiple instances of such virtualized controllers can coordinate within a cluster to form the distributed storage system 660 which can, among other operations, manage the storage pool 570. This architecture further facilitates efficient scaling of the distributed virtualization system. The foregoing virtualized controllers can be implemented in distributed virtualization environment 600 using various techniques. Specifically, an instance of a virtual machine at a given node can be used as a virtualized controller in a hypervisor-assisted virtualization environment to manage storage and I/O (input/output or IO) activities. In this case, for example, the virtualized entities at node $252_{11}$ can interface with a controller virtual machine (e.g., virtualized controller $662_{11}$) through hypervisor $654_{11}$ to access the storage pool 570. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 660.

For example, a hypervisor at one node in the distributed storage system 660 might correspond to VMware ESXi software, and a hypervisor at another node in the distributed storage system 660 might correspond to Nutanix AHV software. As another virtualized controller implementation example, containers (e.g., Docker containers) can be used to implement a virtualized controller (e.g., virtualized controller $662_{1M}$) in an operating system virtualization environment at a given node. In this case, for example, the virtualized entities at node $252_{1M}$ can access the storage pool 570 by interfacing with a controller container (e.g., virtualized controller $662_{1M}$) through hypervisor $654_{1M}$ and/or the kernel of host operating system $656_{1M}$.

In certain embodiments, one or more instances of a redistribution agent can be implemented in distributed storage system 660 to facilitate the herein disclosed techniques. Specifically, as shown, redistribution agent $102_{11}$ can be implemented in virtualized controller $662_{11}$ at node $252_{11}$ and redistribution agent $102_{1M}$ can be implemented in virtualized controller $662_{1M}$ at node $252_{1M}$. Such instances of the redistribution agent and/or virtualized controller can be implemented in any node in any cluster. Actions taken by one or more instances of the redistribution agent and/or virtualized controller can apply to a node (or between nodes), and/or to a cluster (or between clusters), and/or between any resources or subsystems or processing environments accessible by the virtualized controller or their agents (e.g., redistribution agent).

As further shown, any of the foregoing virtualized entities can host instances of the earlier described configuration manager, load balancer, task scheduler, web server, and/or other components and/or agents. As can be observed, the data stores associated with the herein disclosed techniques can be stored in various storage facilities in storage pool 570. As an example, various instances of resource registry 228, task log file 106, and failure processing rules 108 might be distributed across the storage pool 570 to facilitate reliable access by any of the node-specific instances of the redistribution agent and/or a respective virtualized storage controller. As such, the redistribution agent can operate on the basis that any node of the cluster can serve as a host for a redistributed task, at least inasmuch as each node hosts its own respective instance of a virtualized storage controller (e.g., instanced from a common code base), and that such a virtualized storage controller can access the shared storage facility on behalf of any redistributed task. The aforementioned web services can be accessed from any node of the cluster so as to execute certain tasks. Moreover, the web services can operate on any one or more of the nodes in a given cluster, and any web service or component thereof can access the storage pool through a respective node's storage controller.

ADDITIONAL EMBODIMENTS OF THE DISCLOSURE

Additional Practical Application Examples

Figure 7:
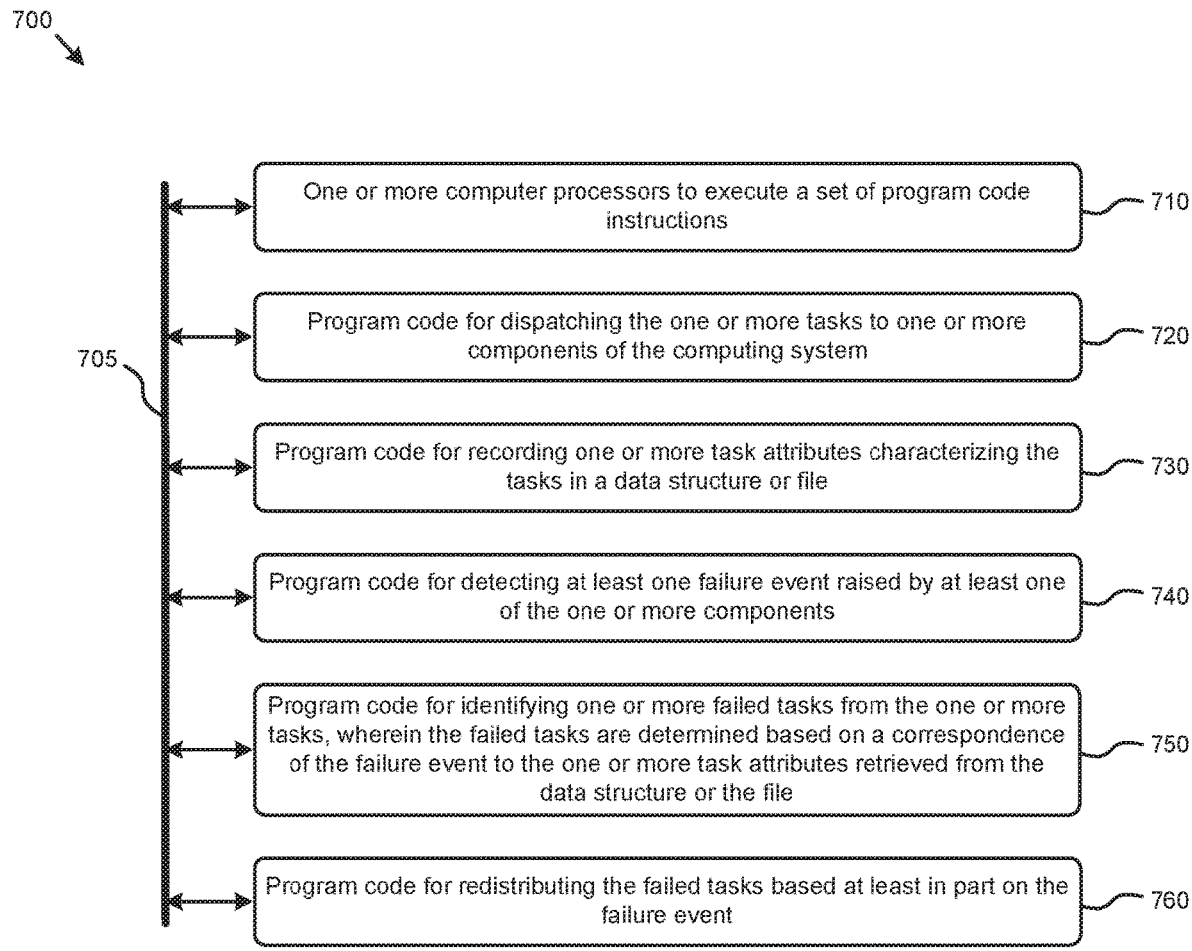
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually and/or as combined, serve to form improved technological processes that address efficiently and reliably executing resource management operations in the presence of processing environment failures. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising a computer processor to execute a set of program code instructions (module 710) and modules for accessing memory to hold program code instructions to perform: dispatching the one or more tasks to one or more components of the computing system (module 720); recording one or more task attributes characterizing the tasks in a data structure or file (module 730); detecting at least one failure event raised by at least one of the one or more components (module 740); identifying one or more failed tasks from the one or more tasks, wherein the failed tasks are determined based on a correspondence of the failure event to the one or more task attributes retrieved from the data structure or the file (module 750); and redistributing the failed tasks based at least in part on the failure event (module 760).

Variations of the foregoing may include more or fewer of the shown modules. Certain variations may perform more or fewer (or different) steps, and/or certain variations may use data elements in more, or in fewer (or different) operations. Still further, some embodiments include variations in the operations performed, and some embodiments include variations of aspects of the data elements used in the operations.

System Architecture Overview

Additional System Architecture Examples

Figure 8A:
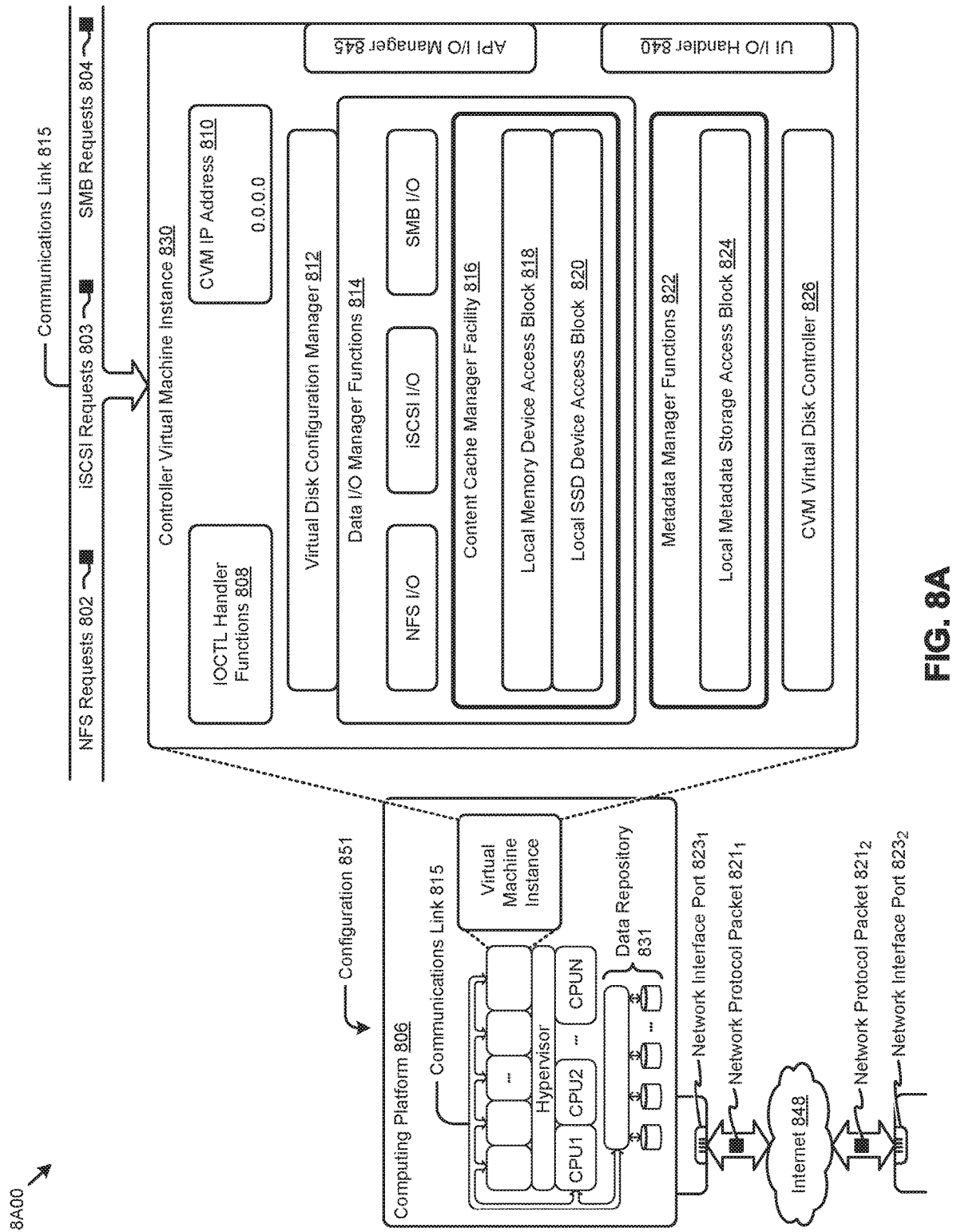
FIG. 8A, FIG. 8B, and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments including variations of any virtualized controllers can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively so as to serve a particular objective, such as to provide high-performance computing capabilities, high-performance networking capabilities, and/or high-performance storage and/or high-capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates efficient use of compute and storage resources by and between the components of the distributed system. Adding a hyperconverged unit to a hyperconverged system expands the system in multiple dimensions. As an example, adding a hyperconverged unit to a hyperconverged system can expand in the dimension of storage capacity while concurrently expanding in the dimension of computing capacity and also in the dimension of networking bandwidth. Components of any of the foregoing distributed systems can comprise physically-and/or logically-distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as containers. In some systems and/or environments, hypervisor-assisted virtualization techniques and operating system virtualization techniques are combined.

As shown, the virtual machine architecture 8A00 comprises a collection of interconnected components suitable for implementing embodiments of the present disclosure and/or for use in the herein-described environments. Moreover, the shown virtual machine architecture 8A00 includes a virtual machine instance in a configuration 851 that is further described as pertaining to the controller virtual machine instance 830. A controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL functions 808) that interface to other functions such as data IO manager functions 814 and/or metadata manager functions 822. As shown, the data IO manager functions can include communication with a virtual disk configuration manager 812 and/or can include direct or indirect communication with any of various block IO functions (e.g., NFS IO, iSCSI IO, SMB IO, etc.).

In addition to block IO functions, the configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through the shown API IO manager 845.

The communications link 815 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 830 includes a content cache manager facility 816 that accesses storage locations, possibly including local dynamic random access memory (DRAM) (e.g., through the local memory device access block 818) and/or possibly including accesses to local solid state storage (e.g., through local SSD device access block 820).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). An external data repository 831 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 824. The external data repository 831 can be configured using a CVM virtual disk controller 826, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2). According to certain embodiments of the disclosure, two or more instances of a configuration 851 can be coupled by a communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). The configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

The computing platform 806 may transmit and receive messages that can be composed of configuration data, and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or results of executing program code can be delivered to a particular user via a download (e.g., a download from the computing platform 806 over the Internet 848 to an access device).

The configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A cluster is often embodied as a collection of computing nodes that can communicate between each other through a local area network (e.g., LAN or VLAN) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provision of power to the other units. In some cases, a unit in a rack is dedicated to environmental conditioning functions such as filtering and movement of air through the rack, and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to implement algorithms that facilitate operational and/or performance characteristics pertaining to low failure execution of resource management operations in distributed computing environments. In some embodiments, a module may include one or more state machines and/or combinational logic used to implement or facilitate the operational and/or performance characteristics pertaining to achieving low failure rates for execution of resource management operations in distributed computing environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of low failure execution of resource management operations in distributed computing environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to low failure execution of resource management operations in distributed computing environments, and/or for improving the way data is manipulated when performing computerized operations pertaining to implementation of fine-grained tracking of distributed resource management tasks.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
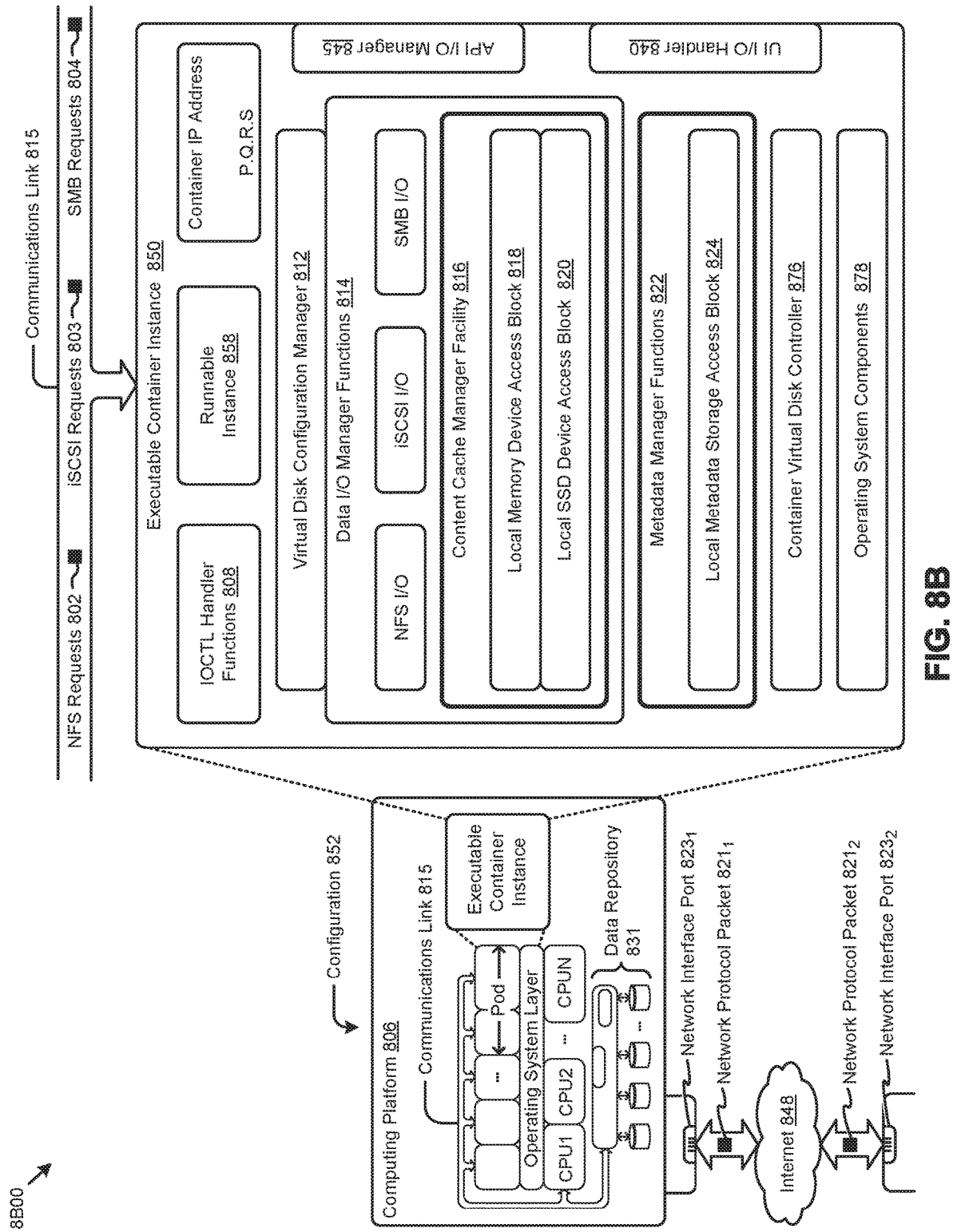

FIG. 8B depicts a virtualized controller implemented by a containerized architecture 8B00. The containerized architecture comprises a collection of interconnected components suitable for implementing embodiments of the present disclosure and/or for use in the herein-described environments. Moreover, the shown containerized architecture 8B00 includes a container instance in a configuration 852 that is further described as pertaining to the container instance 850. The configuration 852 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 850). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls-a", etc.). The container might optionally include operating system components 878, however such a separate set of operating system components need not be provided. As an alternative, a container can include a runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

Figure 8C:
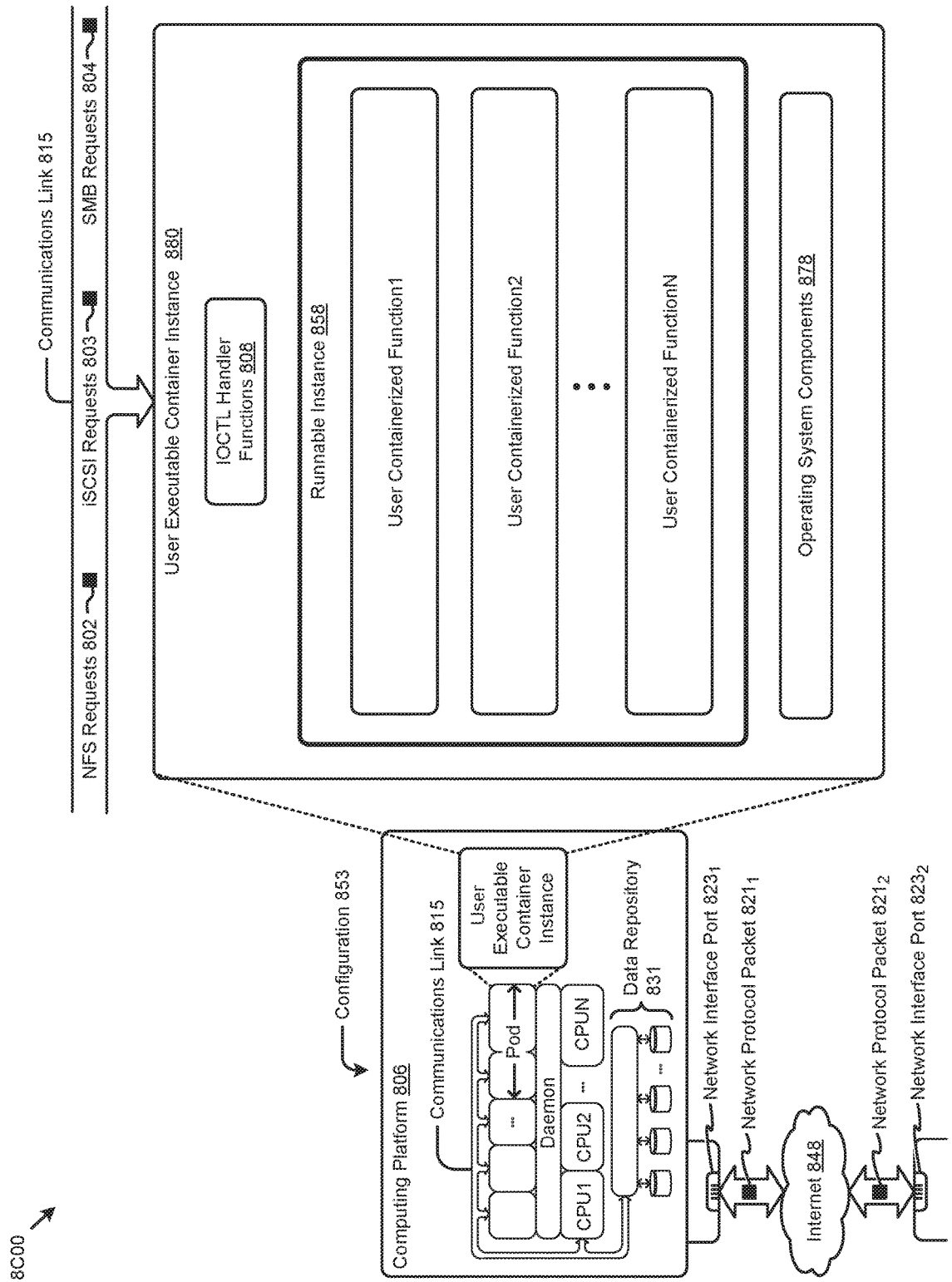

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown instance of daemon-assisted containerized architecture 8C00 includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:
dispatching a task to a component of multiple components of a distributed virtualization system that comprises a storage pool managed and accessible by the multiple components, wherein the component is at a first location in the distributed virtualization system;
recording an attribute characterizing the task in a log in the storage pool, the attribute comprising operational data for the task;
in response to detecting a failure at the first location in the distributed virtualization system, determining whether the task at a second location is disrupted by the failure based at least in part upon the operational data for the task and status of the component; and
determining an action for distributing or terminating the task at least by applying a rule to the failure or the task, the rule relating the status to the action based at least in part upon a dependency relationship.

2. The method of claim 1, wherein the action comprises at least one of a redistribution from a first node to a second node, a redistribution to a different service, a rollback to a previous success point, or a change reversal, the dependency relationship exists between at least the task and a different task pertaining to the failure in the distributed virtualization environment and is used to determine whether the task is disrupted by the different task.

3. The method of claim 2, wherein the redistribution from the first node to a second node or to a different service comprises selecting the second node or the different service respectively from a set of nodes that accesses the storage pool or from a set of services in the distributed virtualization system.

4. The method of claim 2, wherein the second node hosts an instance of a virtualized storage controller that manages the storage pool, and the failure corresponds to the different task executing on a different node, a different service, or a different component in the distributed virtualization system.

5. The method of claim 2, further comprising determining whether a different task corresponding to the failure at the first location spawns a child task or determining whether the task has no parent task for the dependency relationship, wherein the first node and the second node are both nodes of the distributed virtualization system having access to the storage pool.

6. The method of claim 2, wherein the first node includes a hypervisor and a controller virtual machine executing above the hypervisor and manages the storage pool together with a different controller virtual machine on a different node in the distributed virtualization system.

7. The method of claim 1, wherein the attribute includes both first information about the distributed virtualization system and the task that is issued to a resource in the distributed virtualization system; and second information about the dependency relationship.

8. The method of claim 1, wherein the action is determined based at least in part upon a resource attribute of a failed resource and a value of a data element associated with the resource attribute, and the resource attribute is determined at least by querying a log associated with the task.

9. The method of claim 1, wherein a different task corresponding to the failure is determined at the first location at least by querying a log for multiple tasks associated with the failure, and the failure is detected by a leader process at a leader node in the distributed virtualization system.

10. A non-transitory computer readable medium having stored thereon a sequence of instructions which, when stored in memory and executed by a processor, causes the processor to perform a set of acts, the set of acts comprising:
dispatching a task to a component of multiple components of a distributed virtualization system that comprises a storage pool managed and accessible by the multiple components, wherein the component is at a first location in the distributed virtualization system;
recording an attribute characterizing the task in the storage pool, the attribute comprising operational data for the task;
in response to detecting a failure at the first location in the distributed virtualization system, determining whether the task at a second location is disrupted by the failure based at least in part upon the operational data for the task and a status of the component; and
determining an action for the task at least by applying a rule to the failure or the task, the rule relating the status to the action based at least in part upon a dependency relationship.

11. The non-transitory computer readable medium of claim 10, wherein the action comprises at least one of a redistribution from a first node to a second node, a redistribution to a different service, a rollback to a previous success point, or a change reversal, the attribute describes at least one of a processing environment identifier, a node identifier, a processing resource identifier, a computing operation identifier, a task identifier, a parent task identifier, a task state, a processing resource identifier, a parent task or operation identifier, or a task parameter, and the dependency relationship exists between at least the task and a different task pertaining to the failure in the distributed virtualization environment.

12. The non-transitory computer readable medium of claim 11, wherein the redistribution from the first node to the second node or the redistribution to the different service comprises selecting the second node or the different service respectively from a set of nodes that accesses the storage pool or from a set of services in the distributed virtualization system, and the failure is associated with at least one of a processing environment or a Web service.

13. The non-transitory computer readable medium of claim 10, wherein the distributed virtualization system comprises a node, and the node includes a hypervisor and a controller virtual machine executing above the hypervisor and managing the storage pool together with a different controller virtual machine on a different node in the distributed virtualization environment.

14. The non-transitory computer readable medium of claim 13, wherein the attribute includes first information about the distributed virtualization and the task that is issued to a resource in the distributed virtualization system and second information about the dependency relationship.

15. The non-transitory computer readable medium of claim 10, wherein the action includes a time-ordered sequence of multiple actions, and the task comprises a parent task having a child task.

16. The non-transitory computer readable medium of claim 10, wherein the failure corresponding to a different task is detected to occur at the first location on a different node, a different service, or a different component that is different from a node, a service, or a component executing the task in the distributed virtualization system.

17. The non-transitory computer readable medium of claim 10, wherein the set of acts further comprises determining whether a different task pertaining to the failure at the first location spawns a child task or determining whether the task has no parent task for the dependency relationship, and the task is invoked by a Web service request.

18. The non-transitory computer readable medium of claim 10, wherein a different task pertaining to the failure at the first location is determined at least by querying a log for multiple tasks associated with the failure, the dependency relationship is used to determine whether the task is disrupted by the different task, and the failure is detected by a leader process at a leader node in the distributed virtualization system.

19. A system for error recovery in a clustered computing system having a shared storage pool, the system comprising:
a processor;
a non-transitory storage medium having stored thereon a sequence of instructions which, when executed by the processor, causes the processor to perform a set of acts, the set of acts comprising:
dispatching a task to a component of multiple components of a distributed virtualization system that comprises a storage pool managed and accessible by the multiple components, wherein the component is at a first location in the distributed virtualization system;
recording an attribute characterizing the task in a log in the storage pool, the attribute comprising operational data for the task;
in response to detecting a failure at the first location in the distributed virtualization system, determining whether the task at a second location is disrupted by the failure based at least in part upon the operational data for the task and a status of the component; and
determining an action for distributing or terminating the task at least by applying a rule to the failure or the task, the rule relating the status to the action based at least in part upon a dependency relationship.

20. The system of claim 19, wherein the action comprises at least one of a redistribution to a different node, a redistribution to a different service, a rollback to a previous success point, or a change reversal, and the dependency relationship is between at least the task and a different task pertaining to the failure in the distributed virtualization environment and is used to determine whether the task is disrupted by the different task.

21. The system of claim 19, wherein the set of acts further comprises determining whether the different task pertaining to the failure at the first location spawns a child task that is related to the task or determining whether the task has no parent task that is related to the different task.

22. The system of claim 19, wherein determining whether the task at the second location is disrupted by the failure at the first location comprises determining whether the task is related to a different task, and the different task pertaining to the failure at the first location is determined at least by querying a log for multiple tasks associated with the failure.

23. The system of claim 19, wherein the action comprises at least one of a redistribution from a first node to a second node, a redistribution to a different service, a rollback to a previous success point, or a change reversal, the dependency relationship exists between at least the task and a different task pertaining to the failure at the first location in the distributed virtualization environment and is used to determine whether the task is disrupted by the different task.

* * * * *